US012200390B2

United States Patent
Geurts et al.

(10) Patent No.: US 12,200,390 B2
(45) Date of Patent: Jan. 14, 2025

(54) MULTIPLE READ IMAGE SENSORS, AND ASSOCIATED METHODS FOR THE SAME

(71) Applicant: OMNIVISION TECHNOLOGIES, INC., Santa Clara, CA (US)

(72) Inventors: Tomas Geurts, Parkstraat (BE); Amit Mittra, Irvine, CA (US); Kevin Johnson, Kildeer, IL (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 49 days.

(21) Appl. No.: 18/364,416

(22) Filed: Aug. 2, 2023

(65) Prior Publication Data

US 2024/0292131 A1    Aug. 29, 2024

Related U.S. Application Data

(60) Provisional application No. 63/486,909, filed on Feb. 24, 2023.

(51) Int. Cl.
| | |
|---|---|
| H04N 25/78 | (2023.01) |
| H04N 25/59 | (2023.01) |
| H04N 25/616 | (2023.01) |
| H04N 25/771 | (2023.01) |
| H04N 25/79 | (2023.01) |

(52) U.S. Cl.
CPC .................................. *H04N 25/78* (2023.01)

(58) Field of Classification Search
None
See application file for complete search history.

(56) References Cited

U.S. PATENT DOCUMENTS

| | | |
|---|---|---|
| 10,070,081 B2 | 9/2018 | Mo et al. |
| 10,250,828 B1 | 4/2019 | Xu et al. |
| 2005/0092895 A1 | 5/2005 | Fossum |
| 2008/0062286 A1 | 3/2008 | Beck |
| 2009/0236644 A1 | 9/2009 | Adkisson et al. |
| 2009/0309033 A1 | 12/2009 | Cho |
| 2014/0139713 A1 | 5/2014 | Gomi et al. |
| 2016/0234452 A1 | 8/2016 | Aoki |
| 2017/0104946 A1 | 4/2017 | Hong |

(Continued)

OTHER PUBLICATIONS

International Application No. PCT/US2024/017152, International Search Report and Written Opinion Mailed Jul. 24, 2024, pp. 1-27.

*Primary Examiner* — Mark T Monk
(74) *Attorney, Agent, or Firm* — PERKINS COIE LLP

(57) ABSTRACT

Multiple read image sensors, and associated methods for the same, are disclosed herein. In one embodiment, a method comprises reading out a reset level from a pixel to a corresponding sample and hold circuit; storing the reset level to a first storage device and to a second storage device of the sample and hold circuit; reading out a signal level from the pixel to the sample and hold circuit; and storing the signal level to a third storage device and to a fourth storage device of the sample and hold circuit. The reset level and the signal level can correspond to a same correlated double sampling of an image data signal captured by the pixel. The method can further include reading out the reset level from the first storage device; reading out the signal level from the third storage device; and recovering a first copy of the image data signal.

13 Claims, 6 Drawing Sheets

(56) References Cited

U.S. PATENT DOCUMENTS

| | | |
|---|---|---|
| 2018/0091723 A1 | 3/2018 | Funaki |
| 2020/0077040 A1 | 3/2020 | Oh et al. |
| 2020/0112697 A1 | 4/2020 | Huang |
| 2020/0145597 A1 | 5/2020 | Prathipati |
| 2021/0144330 A1 | 5/2021 | Otaka |
| 2021/0235027 A1 | 7/2021 | Meynants |
| 2021/0285896 A1 | 9/2021 | Iwashita et al. |
| 2022/0191416 A1* | 6/2022 | Fowler ................ H04N 25/771 |
| 2022/0264042 A1 | 8/2022 | Innocent et al. |
| 2024/0107191 A1 | 3/2024 | Dierickx |

\* cited by examiner

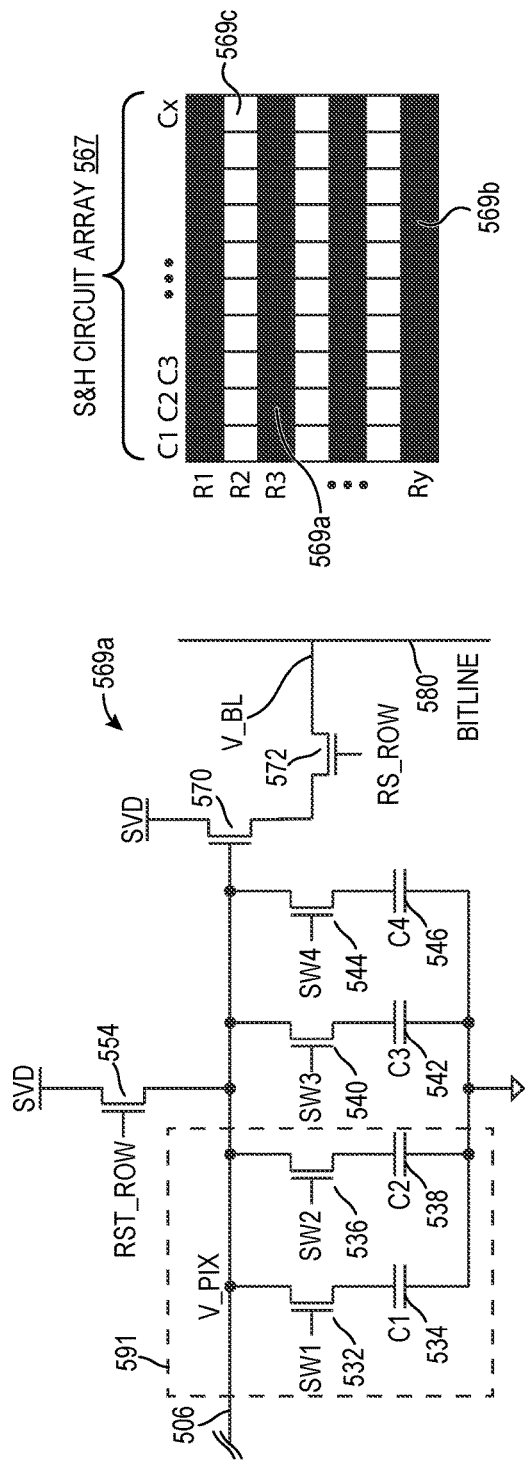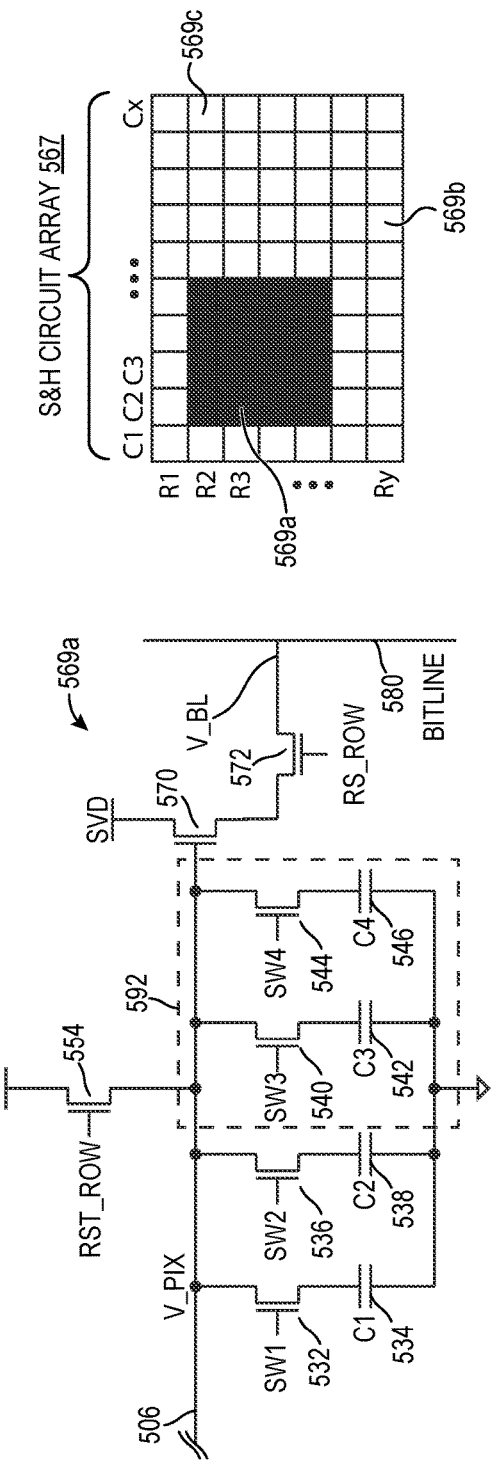
FIG. 5A
FIG. 5B

MULTIPLE READ IMAGE SENSORS, AND ASSOCIATED METHODS FOR THE SAME

CROSS-REFERENCE TO RELATED APPLICATION(S)

The present application claims the benefit of U.S. Provisional Patent Application No. 63/486,909, filed Feb. 24, 2023, which is incorporated by reference herein in its entirety.

TECHNICAL FIELD

This disclosure relates generally to image sensors. For example, several embodiments of the present technology relate to CMOS image sensors with sample and hold circuits that facilitate reading out a same image signal of a pixel multiple times, and associated methods for the same.

BACKGROUND

Image sensors have become ubiquitous and are now widely used in digital cameras, cellular phones, security cameras, as well as medical, automobile, and other applications. As image sensors are integrated into a broader range of electronic devices, it is desirable to enhance their functionality, performance metrics, and the like in as many ways as possible (e.g., resolution, power consumption, dynamic range, etc.) through both device architecture design as well as image acquisition processing.

A typical image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which is read out as analog image signals from the column bitlines and converted to digital values to provide information that is representative of the external scene.

BRIEF DESCRIPTION OF THE DRAWINGS

Non-limiting and non-exhaustive embodiments of the present technology are described below with reference to the following figures, in which like or similar reference characters are used to refer to like or similar components throughout unless otherwise specified.

FIGS. 5A and 5B each illustrate (i) a circuit diagram of a sample and hold circuit corresponding to a pixel and (ii) a partially schematic block diagram of an array of sample and hold circuits showing a first region of interest (FIG. 5A) and a second region of interest (FIG. 5B), in accordance with various embodiments of the present technology.

Figure 1:
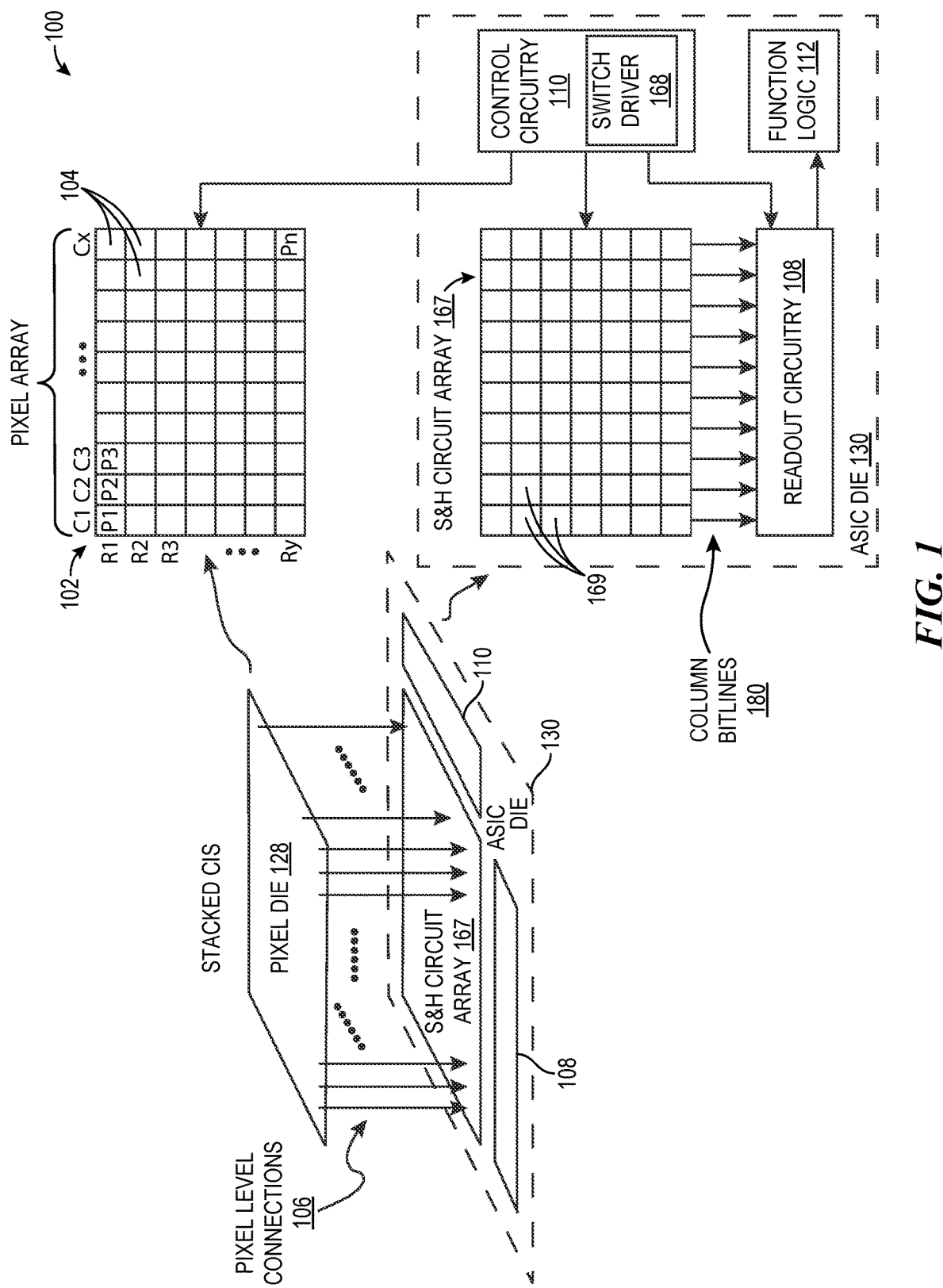
FIG. 1 is a partially schematic block diagram of an imaging system configured in accordance with various embodiments of the present technology.

Skilled artisans will appreciate that elements in the figures are illustrated for simplicity and clarity and are not necessarily drawn to scale. For example, the dimensions of some of the elements in the figures may be exaggerated relative to other elements to aid in understanding of various aspects of the present technology. In addition, common but well-understood elements or methods that are useful or necessary in a commercially feasible embodiment are often not depicted in the figures or described in detail below to avoid unnecessarily obscuring the description of various aspects of the present technology.

DETAILED DESCRIPTION

This disclosure relates generally to image sensors. For example, several embodiments of the present technology relate to CMOS image sensors with sample and hold circuits that facilitate reading out a same image signal of a pixel multiple times, and associated methods for the same. In the following description, specific details are set forth to provide a thorough understanding of aspects of the present technology. One skilled in the relevant art will recognize, however, that the systems, devices, and techniques described herein can be practiced without one or more of the specific details set forth herein, or with other methods, components, materials, etc.

Reference throughout this specification to an "example" or an "embodiment" means that a particular feature, structure, or characteristic described in connection with the example or embodiment is included in at least one example or embodiment of the present technology. Thus, use of the phrases "for example," "as an example," or "an embodiment" herein are not necessarily all referring to the same example or embodiment and are not necessarily limited to the specific example or embodiment discussed. Furthermore, features, structures, or characteristics of the present technology described herein may be combined in any suitable manner to provide further examples or embodiments of the present technology.

Spatially relative terms (e.g., "beneath," "below," "over," "under," "above," "upper," "top," "bottom," "left," "right," "center," "middle," and the like) may be used herein for case of description to describe one element's or feature's relationship relative to one or more other elements or features as illustrated in the figures. It will be understood that the spatially relative terms are intended to encompass different orientations of a device or system in use or operation, in addition to the orientation depicted in the figures. For example, if a device or system illustrated in the figures is rotated, turned, or flipped about a horizontal axis, elements or features described as "below" or "beneath" or "under" one or more other elements or features may then be oriented "above" the one or more other elements or features. Thus, the exemplary terms "below" and "under" are non-limiting and can encompass both an orientation of above and below. The device or system may additionally, or alternatively, be otherwise oriented (e.g., rotated ninety degrees about a vertical axis, or at other orientations) than illustrated in the figures, and the spatially relative descriptors used herein are interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

A. OVERVIEW

Occasionally, it is desirable to read out and/or process image data signals corresponding to a pixel, multiple times. For example, it may be desirable to read out or process image data signals of a frame that correspond to a first region of interest, and then read out or process image data signals of the same frame that correspond to a second region of interest that differs from the first region of interest. In the event that the second region of interest at least partially overlaps the first region of interest, two image data signals (which may be copies of a same image data signal) from each pixel that is included in both the first region of interest and the second region of interest may be needed.

One approach to generating and storing two copies of such image data signals includes using SRAM storage. But adding SRAM storage consumes excess power, significantly adds to the overall size or footprint of an image sensor, and adds leakage power. Another approach is to implement per pixel analog-to-digital conversion, but such an implementation is not feasible at most targeted pixel sizes. Still another approach is to read out image data signals and store multiple copies of the image data signals in readout circuitry, in a memory (e.g., a FIFO), in function logic, or in a host device. But such an approach requires a large amount of memory, especially when the different regions of interest are not known ahead of time and thus multiple copies of every image data signal must be stored. Furthermore, many existing pixel circuits and sample and hold circuits are partially destructive, causing high noise during readouts. And those that facilitate non-destructive readouts are generally too large or consume too much power.

To address these concerns, several embodiments of the present technology are directed to imaging systems and image sensors with sample and hold circuits that include multiple pairs of storage devices (e.g., capacitors). In one embodiment, a sample and hold circuit includes at least four capacitors. A reset level signal read out from a pixel can be stored to at least two of the capacitors, and a corresponding signal level signal read out from the pixel and corresponding to a same correlated double sampling of an image data signal can be stored to at least two other ones of the capacitors. Thereafter, one copy of the reset level signal and one copy of the signal level signal can be read out of the sample and hold circuitry as a pair to recover a first copy of the image data signal corresponding to the pixel, such as when the pixel and/or the sample and hold circuit corresponds to a first (e.g., user-defined) region of interest. Additionally, or alternatively, the other copy of the reset level signal and the other copy of the signal level signal can be read out of the sample and hold circuitry as a pair to recover a second copy of the image data signal corresponding to the pixel, such as when the pixel and/or the sample and hold circuit corresponds to a second (e.g., user-defined) region of interest. In some embodiments, when the pixel and/or the sample and hold circuit do not correspond to the first region of interest or to the second region of interest, at least one of the copies of the reset level signal and at least one of the copies of the signal level signal can be discarded (e.g., by resetting or grounding the corresponding storage devices of the sample and hold circuit) or can be read out and ignored (e.g., by leaving a corresponding ADC in the readout circuitry idle or disabled during the readout). Additionally, or alternatively, when multiple reads of an image data signal are not needed or desired, the multiple read functionality of the imaging system can be disabled, and the imaging system can be operated in other modes (e.g., high dynamic range mode, correlated double sampling (CDS) mode to obtain a single copy of an image data signal, correlated multi sampling (CMS) mode, etc.).

In this manner, the present technology leverages the storage devices included in sample and hold circuits to facilitate reading out multiple (e.g., two or more) copies of a same image data signal. Thus, the present technology facilitates multiple reads of a same image data signal without introducing additional hardware or circuitry that takes up additional space, introduces additional memory or SRAM leakage, or consumes additional power. Furthermore, it is expected that the present technology can be implemented mostly with minor modifications of software, firmware, or hardware of control circuitry of an imaging system. Moreover, it is expected that the multiple reads enabled by the present technology will not consume much additional power (other than for the additional analog-to-digital conversions performed in readout circuitry for the additional data reads). Indeed, when a first region of interest corresponds to a sparse read of pixels of a pixel array and/or a second region of interest corresponds to a windowed read of the pixels of a pixel array, the present technology is expected to reduce power consumption of the imaging system in comparison to imaging systems that read out image data signals for every pixel of the pixel array.

B. SELECTED EMBODIMENTS OF IMAGE SENSORS WITH MULTIPLE READ PIXEL CELLS, AND METHODS FOR THE SAME

FIG. 1 is a partially schematic block diagram of an imaging system 100 configured in accordance with various embodiments of the present technology. As shown, the imaging system 100 is implemented as a CMOS image sensor (CIS) in a stacked chipped scheme that includes a pixel die 128 stacked with a logic die or an application specific integrated circuit (ASIC) die 130. The pixel die 128 includes an array 102 of pixel cells 104 ("pixels 104"), and the ASIC die 130 includes an array 167 of sample and hold circuits 169 that are coupled to corresponding pixels 104 of the array 102 via corresponding pixel level connections 106. The ASIC die 130 further includes readout circuitry 108, control circuitry 110, and function logic 112.

The pixel array 102 can be a two-dimensional (2D) array of the pixels 104. For example, the pixels 104 (identified individually in FIG. 1 as pixel PI through pixel Pn) can be arranged in rows (identified individually in FIG. 1 as row R1 through row Ry) and columns (identified individually in FIG. 1 as column C1 to column Cx) in the array 102. Although arranged in rows and columns in the illustrated embodiment, the pixels 104 may be arranged in the array 102 in other configurations in other embodiments.

At least a subset of the pixels 104 can be configured to acquire image charge in response to incident light received from an external scene, and to generate a corresponding analog image charge data signal based at least in part on the acquired image charge. After the pixels 104 have acquired image charge, the corresponding analog image charge data signals can be read out along corresponding column bitlines 180 into the readout circuitry 108 of the ASIC die 130 through corresponding sample and hold circuits 169 of the array 167. More specifically, an analog image charge data signal corresponding to image charge acquired by a pixel 104 can be read out from the pixel 104 into a corresponding sample and hold circuit 169 of the array 167 via a corresponding pixel level connection 106. As discussed in greater detail below, the analog image charge data signal can then be stored in one or more storage devices of the corresponding sample and hold circuit 169. For example, an analog image charge data signal read out of the pixel 104 can include a reset level signal and a signal level signal. The reset level signal and the signal level signal can be stored to one or more pairs of capacitors in the corresponding sample and hold circuit 169 (e.g., the reset level signal can be stored to a first capacitor of a pair, and the signal level signal can be stored to a second capacitor of the pair, or vice versa). In turn, the analog image charge data signal can be read out from the corresponding sample and hold circuit 169 into the readout circuitry 108 along a corresponding column bitline 180.

In some embodiments, the analog image charge data signals are read out from the pixel array 102 and/or the sample and hold circuit array 167 one row at a time. Alternatively, the analog image charge data signals are read out from the pixel array 102 and/or the sample and hold circuit array 167 using other suitable techniques, such as (a) using a serial read out technique to read out the pixels 104 and/or analog image charge data signals stored to sample and hold circuits 169 one-by-one in sequence or (b) using a parallel read out technique to read out all or a subset (e.g., multiple rows) of the pixels 104 and/or the sample and hold circuits 169 simultaneously.

When the analog image charge data signals are read into the readout circuitry 108, the analog image charge data signals can be converted into digital values (digital representations) using an analog-to-digital converter (ADC)—not shown in FIG. 1. In some embodiments, the ADC of the readout circuitry 108 has adjustable gain such that the analog image charge data signals can be read out of the pixel array 102 with multiple gain settings. Although not shown in FIG. 1, the readout circuitry 108 can additionally, or alternatively, include amplification circuitry, column readout circuitry, and/or other circuitry.

The digital representations of the analog image charge data signals may then be transferred from the readout circuitry 108 to the function logic 112. In some embodiments, the function logic 112 is configured to simply store the digital representations as image data. In other embodiments, the function logic 112 can be configured to manipulate the image data (e.g., by applying post image effects, such as crop, rotate, red eye removal, brightness adjustment, contrast adjustment, etc.) in addition to storing the image data. The image data can be used to render an image of the external scene (e.g., of a person, place, object, etc. within the external scene) from which the light incident on the pixels 104 of the pixel array 102 was received.

As shown, the control circuitry 110 is coupled to the pixel array 102 and to the sample and hold circuit array 167. In some embodiments, the control circuitry 110 controls operational characteristics of the pixel array 102 and the sample and hold circuit array 167. For example, the control circuitry 110 can generate transfer signals and/or other control signals (e.g., reset signals) that are used (a) to control transfer of image charge and/or other signals within each of the pixels 104 and/or (b) to control readout of analog image charge data signals from the pixels 104 into corresponding sample and hold circuits 169 of the array 167 along the pixel level connections 106. As another example, the control circuitry 110 can include a switch driver 168 that is coupled to the sample and hold circuits 169 of the array 167. The switch driver 168 can be configured to generate control signals that are used to control the sample and hold circuits 169 to sample and hold (e.g., in the voltage domain) analog image charge data signals (e.g., pairs of reset level signals and signal level signals) read out from the pixels 104.

As another specific example, the control circuitry 110 can generate a shutter signal for controlling image acquisition. The shutter signal can be a global shutter signal (e.g., a voltage domain global shutter (VDGS)) for controlling image acquisition of all pixel values from the pixel array 102 at substantially the same time. For example, the global shutter signal can be used to simultaneously enable all pixels 104 of the pixel array 102 to simultaneously capture respective image charge (and corresponding analog image charge data signals) during a single acquisition window. Alternatively, the shutter signal can be a rolling shutter signal for sequentially controlling image acquisition of all pixel values from the pixel array 102 on a row-by-row basis, column-by-column basis, or other grouping basis. For example, the shutter signal can be used to sequentially enable the pixels 104 of the pixel array 102 to sequentially capture respective image charge (and corresponding analog image charge data signals) during consecutive acquisition windows. In some embodiments, the shutter signal can establish an exposure time (e.g., defined as a length of time that a shutter remains open, although the imaging system 100 may lack a physical shutter). The exposure time can be the same for each image frame, or the exposure time can vary across different image frames. Additionally, or alternatively, image acquisition can be synchronized with lighting effects, such as with a flash.

In some embodiments, the imaging system 100 can be included in a digital camera, cell phone, laptop computer, or the like. Additionally, or alternatively, imaging system 100 can be coupled to other pieces of hardware, such as a processor (general purpose or otherwise), a memory element, an output (a USB port, a wireless transmitter, an HDMI port, etc.), a lighting/flash, an electrical input (a keyboard, a touch display, a track pad, a mouse, a microphone, etc.), and/or a display. Other pieces of hardware may deliver instructions to the imaging system 100, extract image data from the imaging system 100, or manipulate image data supplied by the imaging system 100.

Figure 2:
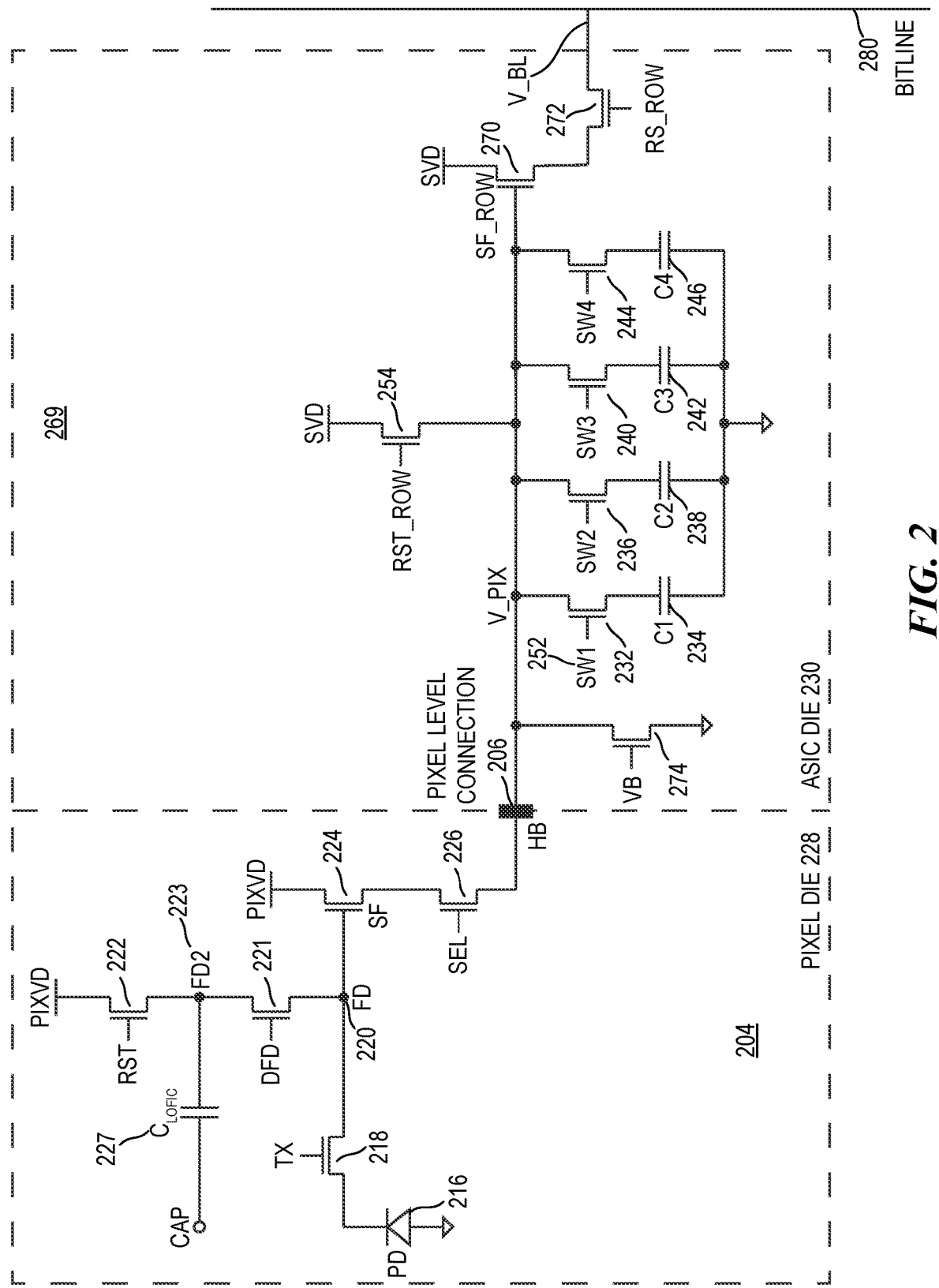
FIG. 2 is a partially schematic circuit diagram of a pixel and a corresponding sample and hold circuit, each configured in accordance with various embodiments of the present technology.

FIG. 2 is a partially schematic circuit diagram of a pixel 204 and a corresponding sample and hold circuit 269, each configured in accordance with various embodiments of the present technology. The pixel 204 can be one of the pixels 104 of the pixel array 102 of FIG. 1 or another pixel of the present technology, and/or the sample and hold circuit 269 can be one of the sample and hold circuits 169 of the sample and hold circuit array 167 of FIG. 1 or another sample and hold circuit of the present technology. Referring first to the pixel 204, the pixel 204 shown in FIG. 2 includes a photosensor 216, a transfer transistor 218, a floating diffusion 220, a reset transistor 222, a source follower transistor 224, and a row select transistor 226. The illustrated pixel 204 additionally includes a dual floating diffusion (DFD) transistor 221, a second floating diffusion 223, and a capacitor CLOFIC 227. The DFD transistor 221, the second floating diffusion 223, and the capacitor CLOFIC 227 can be omitted in other embodiments of the present technology.

In the illustrated embodiment, the photosensor 216 is a photodiode having an anode coupled to ground (e.g., a negative power supply rail or another reference voltage) and a cathode coupled to the transfer transistor 218. In other embodiments of the present technology, the photosensor 216 may be another suitable type of photosensor or photodetector (e.g., a metal-semiconductor-metal (MSM) photodetector, a phototransistor, a photoconductive detector, or a phototube). In operation, the photosensor 216 is configured to photogenerate image charge or photocurrent in response to incident light received from an external scene.

The transfer transistor 218 selectively couples the photosensor 216 to the floating diffusion 220. In particular, the transfer transistor 218 includes a gate configured to receive a transfer signal TX. When the transfer signal TX applied to the gate of the transfer transistor 218 is asserted, the transfer transistor 218 is activated to transfer photogenerated image charge from the photosensor 216 to the floating diffusion 220.

The DFD transistor 221 selectively couples the floating diffusion 220 to the second floating diffusion 223. In particular, the DFD transistor 221 includes a gate configured to receive a signal DFD. When the signal DFD applied to the gate of the DFD transistor 221 is asserted, the DFD transistor 221 is activated to couple the floating diffusion 220 to the second floating diffusion 223.

The capacitor CLOFIC 227 is coupled between the second floating diffusion 223 and a voltage signal CAP. In some embodiments, the capacitor CLOFIC 227 is a lateral overflow integration capacitor (LOFIC), which is coupled to receive the voltage signal CAP.

In the illustrated embodiment, the reset transistor 222 selectively couples the second floating diffusion 223 to a pixel voltage supply PIXVD. More specifically, the reset transistor 222 includes a gate configured to receive a reset signal RST. When the reset signal RST is asserted, the reset transistor 222 is activated to couple the second floating diffusion 223 to the pixel voltage supply PIXVD, thereby resetting the voltage at the second floating diffusion 223. In some embodiments, the signal DFD applied to the gate of the DFD transistor 221 can be asserted while the reset signal RST applied to the gate of the reset transistor 222 is asserted. When this occurs, the DFD transistor 221 and the reset transistor 222 are activated to couple the floating diffusion 220 and the second floating diffusion 223 to the pixel voltage supply PIXVD, thereby resetting the voltage at both the floating diffusion 220 and the second floating diffusion 223. In embodiments in which the DFD transistor 221, the second floating diffusion 223, and the capacitor CLOFIC 227 are omitted from the pixel 204, the reset transistor 222 can be configured to couple the floating diffusion 220 to the pixel voltage supply PIXVD upon assertion of the reset signal RST.

The floating diffusion 220 (and the second floating diffusion 223 when the DFD transistor 221 is activated) is further coupled to a gate of the source follower transistor 224. In operation, the source follower transistor 224 is configured to convert charge at the floating diffusion 220 (and/or the second floating diffusion 223) to an analog signal at the source of the source follower transistor 224.

The row select transistor 226 selectively couples the source of the source follower transistor 224 to a pixel level connection 206 (e.g., one of the pixel level connections 106 of FIG. 1). More specifically, the row select transistor 226 includes a gate configured to receive a row select signal SEL. As the row select signal SEL is asserted, the row select transistor 226 is activated to pass analog signals received from the source follower transistor 224 to the sample and hold circuit 269 via the pixel level connection 206. In some embodiments, the pixel level connection 206 is a hybrid bond (HB).

In an imaging system that utilizes correlated double sampling (CDS), the imaging system uses the pixel 204 to obtain a reset level and a signal level. In particular, after the floating diffusion 220 is reset by asserting the reset signal RST and/or the signal DFD, the imaging system obtains a reset level by reading out, through the row select transistor 226 and the pixel level connection 206, a first analog signal at the source of the source follower transistor 224 that corresponds to a voltage applied to the gate of the source follower transistor 224 at the floating diffusion 220. In addition, after the photosensor 216 photogenerates image charge and the image charge is transferred to the floating diffusion 220 via the transfer transistor 218, the imaging system obtains a signal level by reading out, through the row select transistor 226 and the pixel level connection 206, a second analog signal at the source of the source follower transistor 224 that corresponds to the image charge at the floating diffusion 220. For high dynamic range (HDR) applications, a similar process can be performed (e.g., repeated) to obtain a reset level and a signal level corresponding to the floating diffusion 220 in combination with the second floating diffusion 223. Once the imaging system reads out the reset level and the signal level from the pixel 204 to the sample and hold circuit 269, the imaging system can obtain an image data signal by (a) reading the reset level and the signal level out of the sample and hold circuit 269 to readout circuitry (e.g., the readout circuitry 108 of FIG. 1), and (b) subtracting the reset level from the signal level to cancel out noise read out in the signal level.

Referring now to the sample and hold circuit 269 of FIG. 2, the sample and hold circuit 269 includes a first storage transistor 232 and a corresponding first storage device 234, a second storage transistor 236 and a corresponding second storage device 238, a third storage transistor 240 and a corresponding third storage device 242, and a fourth storage transistor 244 and a corresponding fourth storage device 246. The first storage transistor 232 selectively couples the first storage device 234 to the pixel level connection 206. In particular, the first storage transistor 232 includes a gate configured to receive a first switch signal SW1. When the first switch signal SW1 is asserted, the first storage transistor 232 is activated to couple the first storage device 234 to the pixel level connection 206. Similarly, the second storage transistor 236, the third storage transistor 240, and the fourth storage transistor 244 are configured to selectively couple the second storage device 238, the third storage device 242, and the fourth storage device 246, respectively, to the pixel level connection 206 based at least in part on assertion of a second switch signal SW2, a third switch signal SW3, and a fourth switch signal SW4, respectively, applied to a corresponding gate of the second storage transistor 236, the third storage transistor 240, and the fourth storage transistor 244. The first switch signal SW1, the second switch signal SW2, the third switch signal SW3, and the fourth switch signal SW4 can be generated by a switch driver (e.g., the switch driver 168 of the control circuit 110 of FIG. 1).

In the illustrated embodiment, the first storage device 234, the second storage device 238, the third storage device 242, and the fourth storage device 246 are each capacitors but can be other storage elements (e.g., pinned storage gates, storage diodes, etc.) in other embodiments of the present technology. The second storage device 238, the third storage device 242, and the fourth storage device 246 can be or include metal-insulator-metal (MIM) capacitors that have high capacitance per unit area with low parasitics. As shown, the first storage device 234, the second storage device 238, the third storage device 242, and the fourth storage device 246 have respective capacitances C1, C2, C3, and C4. The capacitances C1, C2, C3, and C4 can be equivalent to each other, or at least one of the capacitances C1, C2, C3, and C4 can vary from another one of the capacitances C1, C2, C3, and C4. As a specific example, each of the capacitances C1, C2, C3, and C4 can be equivalent to 70 fF.

The first storage device 234, the second storage device 238, the third storage device 242, and the fourth storage device 246 are coupled between (a) the first storage transistor 232, the second storage transistor 236, the third storage transistor 240, and the fourth storage transistor 244, respectively, and (b) ground. More specifically, first plates or terminals of the first storage device 234, the second storage device 238, the third storage device 242, and the fourth storage device 246 are coupled to the first storage transistor 232, the second storage transistor 236, the third storage transistor 240, and the fourth storage transistor 244, respectively; and second plates or terminals of the first storage device 234, the second storage device 238, the third storage device 242, and the fourth storage device 246 are coupled to ground. In other embodiments, the second plates or terminals of the first storage device 234, the second storage device 238, the third storage device 242, and the fourth storage device 246 can be coupled to another voltage (e.g., a low supply voltage DOVDD). In some embodiments, it is desirable to preserve stored charge values on the first storage device 234, the second storage device 238, the third storage device 242, and the fourth storage device 246. In these embodiments, the voltage values of ground (or of the low supply voltage DOVDD) and a supply voltage SVD can be tuned to reduce or minimize static leakage currents when the first storage transistor 232, the second storage transistor 236, the third storage transistor 240, and the fourth storage transistor 244 are deactivated.

In the illustrated embodiment, the sample and hold circuit 269 further includes a reset row transistor 254, a bias transistor 274, a source follower transistor 270, and a row select transistor 272. The reset row transistor 254 is configured to selectively couple the pixel level connection 206 to the supply voltage SVD. In particular, the reset row transistor 254 includes a gate configured to receive a reset row signal RST_ROW. When the reset row signal RST_ROW is asserted, the reset row transistor 254 is activated to couple the pixel level connection 206 to the supply voltage SVD.

The bias transistor 274 is coupled between the pixel level connection 206 and ground. The bias transistor 274 includes a gate that is biased with a bias voltage VB. The bias transistor 274 serves as a current source. More specifically, the bias transistor 274 functions as a current source that provides current (e.g., ~20 nA) to the source follower transistor 224 of the pixel 204.

The source follower transistor 270 includes a gate coupled to the pixel level connection 206. In operation, the source follower transistor 270 is configured to convert charge at the pixel level connection 206 (corresponding to voltage V_PIX) to an analog signal at the source of the source follower transistor 270.

The row select transistor 272 selectively couples the source of the source follower transistor 270 to a column bitline 280 (e.g., one of the column bitlines 180 of FIG. 1). More specifically, the row select transistor 272 includes a gate configured to receive a row select row signal RS_ROW. As the row select row signal RS_ROW is asserted, the row select transistor 272 is activated to pass analog signals received from the source follower transistor 270 to readout circuitry (e.g., the readout circuitry 108 of FIG. 1) via the column bitline 280.

As discussed above, the sample and hold circuit 269 can be used to perform correlated double sampling (CDS). For example, the reset signal RST and the signal DFD can be asserted to activate the reset transistor 222 and the DFD transistor 221 of the pixel 204, respectively, to couple the floating diffusion 220 and the second floating diffusion 223 of the pixel 204 to the pixel supply voltage PIXVD and thereby reset the voltage at the floating diffusion 220 and the second floating diffusion 223. Thereafter, the reset signal RST and the DFD signal can be unasserted to deactivate the reset transistor 222 and the DFD transistor 221, respectively, and the row select signal SEL can be asserted to activate the row select transistor 226. In turn, a reset level signal can be read out of the pixel 204 to the sample and hold circuit 269 via the pixel level connection 206. The reset level signal can then be stored to one or more of the first storage device 234, the second storage device 238, the third storage device 242, and/or the fourth storage device 246. For example, the first switch signal SW1 can be asserted to activate the first storage transistor 232 and couple the first storage device 234 to the pixel level connection 206. The first switch signal SW1 can then be unasserted to store the reset level signal on the first storage device 234. In some embodiments, the reset row signal RST_ROW can then be asserted to activate the reset row transistor 254 and reset the voltage V_PIX at the pixel level connection 206.

Continuing with the above example, the transfer signal TX can be asserted to activate the transfer transistor 218 of the pixel 204 and couple the photosensor 216 of the pixel 204 to the floating diffusion 220. As a result, image charge or photocurrent generated by the photosensor 216 in response to incident light received from an external scene can be transferred to the floating diffusion 220 and applied to the gate of the source follower transistor 224. In turn, a corresponding analog signal level signal can be output from the pixel 204 to the sample and hold circuit 269 via the pixel level connection 206. The signal level signal can then be stored to one or more of the first storage device 234, the second storage device 238, the third storage device 242, and/or the fourth storage device 246 (e.g., to one or more of the storage devices that are not currently storing the reset level signal). For example, the second switch signal SW2 can be asserted to activate the second storage transistor 236 and couple the second storage device 238 to the pixel level connection 206. The second switch signal SW2 can then be unasserted to store the signal level signal on the second storage device 238. In some embodiments, the reset row signal RST_ROW can then be asserted to activate the reset row transistor 254 and reset the voltage V_PIX at the pixel level connection 206.

After being stored in the sample and hold circuit 269, the reset level signal and the signal level signal can be read out of the sample and hold circuit 269 to readout circuitry (e.g., the readout circuitry 108 of FIG. 1) sequentially. For example, the reset level signal stored to the first storage device 234 can be read out of the sample and hold circuit 269 by asserting the first switch signal SW1 and the row select row signal RS_ROW. In some embodiments, the voltage V_PIX at the pixel level connection 206 can then be reset (e.g., by asserting the reset row signal RST_ROW). Thereafter, the signal level signal stored to the second storage device 238 can be read out of the sample and hold circuit 269 by asserting the second switch signal SW2 and the row select row signal RS_ROW. In some embodiments, the voltage V_PIX at the pixel level connection 206 can then be reset (e.g., by asserting the reset row signal RST_ROW). After receiving the reset level signal and the corresponding signal level signal, the readout circuitry can generate an image data signal by subtracting the reset level signal from the signal level signal.

In some embodiments, the CDS process described above can be repeated (e.g., before or after reading out the reset level signal and/or the signal level signal from the sample and hold circuit 269) to store another reset level signal and signal level signal corresponding to another image data signal of the pixel 204. The other reset level signal and signal level signal can be stored to a same pair of the storage devices (e.g., the first storage device 234 and the second storage device 238) previously used to store the reset level signal and the signal level signal discussed above, to the pair of storage devices (e.g., the third storage device 242 and the fourth storage device 246) that were not previously used to store the reset level signal and the signal level signal discussed above, or to another combination of the storage devices (e.g., to the second storage device 238 and the third storage device 242). Thus, the pixel 204 and the sample and hold circuit 269 can facilitate capturing images using correlated multi sampling (CMS) techniques. Alternatively, the pixel 204 and a corresponding imaging system may utilize only a subset of the storage devices (e.g., the first storage device 234 and the second storage device 238) to store signals read out of the pixel 204 before reading those signals out of the sample and hold circuit 269. In these embodiments, storage devices not included in the subset (e.g., the third storage device 242 and the fourth storage device 246) may not be utilized, or may be utilized by another pixel as discussed in greater detail below with reference to FIG. 6.

The reset level signal and the signal level signal discussed in the above example were read out of the pixel 204 while the DFD transistor 221 of the pixel 204 was deactivated. In some embodiments, the pixel 204 and the sample and hold circuit 269 can be configured to read out a reset level signal and a signal level signal while the DFD transistor 221 is activated in addition to or in lieu of reading out a reset level signal or a signal level signal from the pixel 204 while the DFD transistor 221 is deactivated. For example, the reset level signal and the signal level signal that were read out of the pixel 204 while the DFD transistor 221 was deactivated in the above example can be a first reset level signal and a first signal level signal, and may correspond to a high gain image data signal that is usable to generate a high dynamic range (HDR) image. Continuing with this example, the pixel 204 and the sample and hold circuit 269 can additionally be configured to activate the DFD transistor 221 and read out a low gain image data signal from the pixel 204 that can be used in combination with the high gain image data signal to generate an HDR image.

More specifically, after the first reset level signal and the first signal level signal discussed in the above example are read out of the pixel 204 and stored to the first storage device 234 and the second storage device 238, respectively, the reset signal RST and the signal DFD can again be asserted (e.g., while the row select signal SEL is asserted or unasserted) to reset the voltage at the floating diffusion 220 and the second floating diffusion 223. Thereafter, the reset signal RST can be unasserted to deactivate the reset transistor 222 while the signal DFD remains asserted to keep the floating diffusion 220 coupled to the second floating diffusion 223 and to the capacitor CLOFIC 227. The row select signal SEL can again be asserted (or remain asserted), and a second reset level signal can be read out of the pixel 204 to the sample and hold circuit 269 via the pixel level connection 206. The second reset level signal can then be stored to a storage device of the sample and hold circuit 269. For example, the third switch signal SW3 can be asserted to activate the third storage transistor 240 and couple the third storage device 242 to the pixel level connection 206. The third switch signal SW3 can then be unasserted to store the second reset level signal on the third storage device 242. In some embodiments, the reset row signal RST_ROW can then be asserted to activate the reset row transistor 254 and reset the voltage V_PIX at the pixel level connection 206.

Continuing with the above example, the transfer signal TX can be asserted to activate the transfer transistor 218 of the pixel 204 and couple the photosensor 216 to the floating diffusion 220 and the second floating diffusion 223. As a result, image charge or photocurrent generated by the photosensor 216 in response to incident light received from an external scene can be transferred to the floating diffusion 220 and the second floating diffusion 223, and applied to the gate of the source follower transistor 224. In turn, a corresponding second analog signal level signal can be output from the pixel 204 to the sample and hold circuit 269 via the pixel level connection 206. The second signal level signal can then be stored to a storage device of the sample and hold circuit 269. For example, the fourth switch signal SW4 can be asserted to activate the fourth storage transistor 244 and couple the fourth storage device 246 to the pixel level connection 206. The fourth switch signal SW4 can then be unasserted to store the second signal level signal on the fourth storage device 246. In some embodiments, the reset row signal RST_ROW can then be asserted to activate the reset row transistor 254 and reset the voltage V_PIX at the pixel level connection 206.

Thereafter, the first reset level signal stored to the first storage device 234, the first signal level signal stored to the second storage device 238, the second reset level signal stored to the third storage device 242, and the second signal level signal stored to the fourth storage device 246 can be sequentially read out of the sample and hold circuit 269 to readout circuitry (e.g., the readout circuitry 108 of FIG. 1) by asserting the first switch signal SW1, the second switch signal SW2, the third switch signal SW3, the fourth switch signal SW4, and the row select row signal RS_ROW at appropriate timings. In some embodiments, the voltage V_PIX at the pixel level connection 206 can be reset (e.g., by asserting the reset row signal RST_ROW) between each of the reads of the reset level signals and the signal level signals out of the sample and hold circuit 269.

After receiving the first reset level signal and the first signal level signal, the readout circuitry can generate a high gain image data signal by subtracting the first reset level signal from the first signal level signal. In addition, after receiving the second reset level signal and the second signal level signal, the readout circuitry can generate a low gain image data signal by subtracting the second reset level signal from the second signal level signal. In turn, the readout circuitry and/or function logic (e.g., the function logic 112 of FIG. 1) can combine the high gain image data signal with the low gain image data signal to generate an HDR image data signal that can be used to generate an HDR image. Thus, the pixel 204 and the sample and hold circuit 269 of FIG. 2 can facilitate capturing HDR images in addition to or in lieu of images generated using CDS and a single image data signal.

As discussed in greater detail below with reference to FIGS. 3-5B, the pixel 204 and the sample and hold circuit 269 can additionally, or alternatively, be used to perform multiple (e.g., two or more) reads of the same image data signal. For example, a same reset level signal read out of the pixel 204 can be stored to two or more storage devices (e.g., the first storage device 234 and the third storage device 242) of the sample and hold circuit 269, and a same signal level signal read out of the pixel 204 can be stored to two or more storage devices (e.g., the second storage device 238 and the fourth storage device 246) of the sample and hold circuit 269. Continuing with this example, the reset level signal stored to the first storage device 234 and the signal level signal stored to the second storage device 238 can be read out of the sample and hold circuit 269 in a first "image data signal read" (e.g., in a sequential read of the reset level signal and the signal level signal) and used by the readout circuitry to recover a first image data signal. Thereafter, the reset level signal stored to the third storage device 242 and the signal level signal stored to the fourth storage device 246 can be read out of the sample and hold circuit 269 in a second "image data signal read" (e.g., in a sequential read of the reset level signal and the signal level signal) and used by the readout circuitry to recover a second image data signal. The first image data signal and the second image data signal can be essentially the same image data signal that are read out of the sample and hold circuit 269 at different times. As discussed in greater detail below, such functionality can facilitate reading out two different regions of interest of a corresponding pixel array (e.g., of the pixel array 102 of FIG. 1) and/or of a corresponding sample and hold circuit array (e.g., of the sample and hold circuit array 167 of FIG. 1). For example, such functionality can facilitate selectively reading out an image data signal corresponding to the pixel 204 for a first region of interest, for a second region of interest, for both the first region of interest and the second region of interest, or for neither the first region of interest or the second region of interest. In some embodiments, regions of interest can be preset, user-defined, and/or defined during or after sampling reset level signal(s) and/or signal level signal(s) for image data signals.

Although the first and second image data signals in the above example are read out from the sample and hold circuit 269 using a first pair of storage devices (comprising the first storage device 234 and the second storage device 238) and a second pair of storage device (comprising the third storage device 242 and the fourth storage device 246) of the sample and hold circuit 269, other pairing of the storage devices are of course possible and within the scope of the present technology. For example, a first image data signal can be read out from the sample and hold circuit 269 by reading out the reset level signal stored to the first storage device 234 and the signal level signal stored to the fourth storage device 246. Additionally, or alternatively, a second image data signal can be read out from the sample and hold circuit 269 by reading out the reset level signal stored to the third storage device 242 and the signal level signal stored to the second storage device 238. In some embodiments, the pairings of storage devices used to read out an image data signal from the sample and hold circuit 269 can stay consistent across multiple frames. In other embodiments, the pairings of storage devices used to read out an image data signal from the sample and hold circuit 269 can change across multiple frames.

Additionally, or alternatively, although the reset level signals are stored to the first storage device 234 and the third storage device 242 in the above examples, any of the storage devices of the sample and hold circuit 269 can be used to store reset level signals and/or signal level signals. For example, the first storage device 234 and the second storage device 238 can be used to store reset level signals, and the third storage device 242 and the fourth storage device 246 can be used to store signal level signals. As another example, the second storage device 238 and the fourth storage device 246 can be used to store reset level signals, and the first storage device 234 and the third storage device 242 can be used to store signal level signals. Which storage devices are used to store which signals (e.g., reset level signals or signal level signals) can remain consistent or can vary across multiple frames.

Furthermore, although the first image data signal was read out from the sample and hold circuit 269 in the above example using a first pair of storage devices (comprising the first storage device 234 and the second storage device 238) of the sample and hold circuit 269 before the second image data signal was read out from the sample and hold circuit 269 using a second pair of storage devices (comprising the third storage device 242 and the fourth storage device 246) of the sample and hold circuit 269, the order in which the first and second image data signals are read out from the sample and hold circuit 269 can be reversed in other embodiments. Additionally, or alternatively, the order in which the first and second image data signals are read out from the sample and hold circuit 269 can be constant or can change across multiple frames.

Moreover, although shown in FIG. 2 with four storage devices arranged in four parallel branches and organized into two separate pairs for reading out image data signals, the sample and hold circuit 269 can include any positive number of storage device (e.g., more than four or less than four storage devices) arranged in any positive number of parallel branches (e.g., more than four or less than four branches) and organized into any positive number of pairs (e.g., more than two or less than two pairs) in other embodiments of the present technology. For example, the sample and hold circuit 269 can include six, eight, ten, or twenty storage devices arranged in six, eight, ten, or twenty parallel branches, respectively, and organized into three, four, five, or ten pairs, respectively. Continuing with this example, this can (for applications in which a same image data signal is read from the sample and hold circuit 269 multiple times) enable three, four, five, or ten reads, respectively, of the same image data signal from the sample and hold circuit 269 using CDS or CMS techniques. As another example, the sample and hold circuit 269 can include two storage devices (e.g., only two storage devices), such as in embodiments in which image data signals are read out from the pixel 204 without using CDS.

In some embodiments, the pixel 204 and the sample and hold circuit 269 of FIG. 2 can be used to perform CDS, CMS, HDR sampling, and/or multiple read of one or more image data signals. For example, a user or a control circuit (e.g., the control circuitry 110 of FIG. 1) corresponding to the pixel 204 and the sample and hold circuit 269 can selectively enable and/or disable CDS, CMS, HDR sampling, and/or multiple read settings to toggle between use of CDS, CMS, HDR sampling, and/or multiple read of one or more image data signals.

Figure 3:
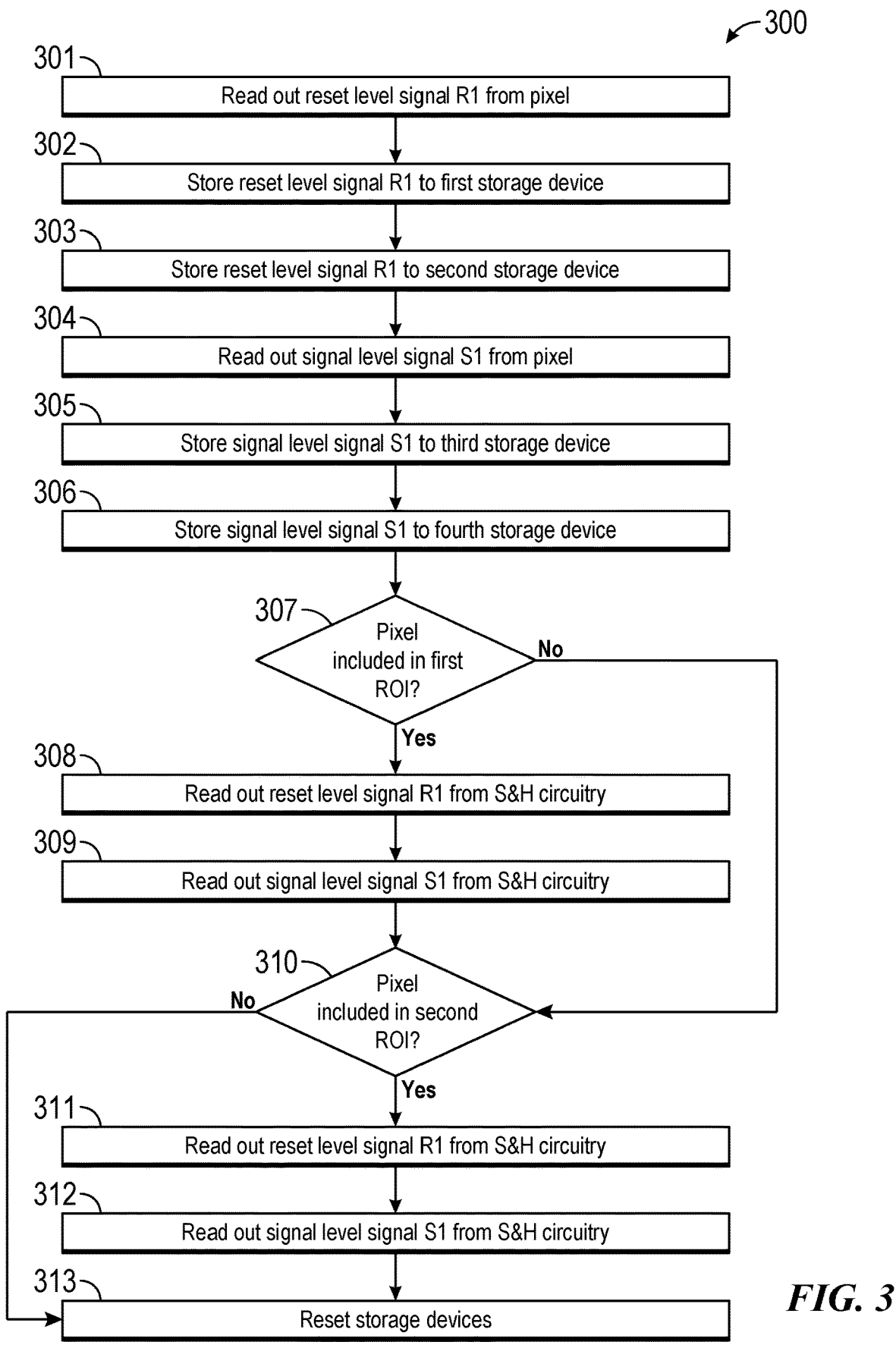
FIG. 3 is a flow diagram illustrating a method of operating a pixel and corresponding sample and hold circuit, in accordance with various embodiments of the present technology.

FIG. 3 is a flow diagram illustrating a method 300 of operating a pixel and corresponding sample and hold circuit, in accordance with various embodiments of the present technology. For example, the method 300 can be a method executed to facilitate multiple reads of the same image data signal from a pixel. The pixel can be a pixel 104 of FIG. 1, the pixel 204 of FIG. 2, or another pixel of the present technology. Additionally, or alternatively, the sample and hold circuit can be a sample and hold circuit 169 of FIG. 1, the sample and hold circuit 269 of FIG. 2, or another sample and hold circuit of the present technology. The method 300 is illustrated as a set of steps or blocks 301-313. All or a subset of one or more of the blocks 301-313 can be executed by various components of an imaging system (e.g., the imaging system 100 of FIG. 1). For example, all or a subset of one or more of the blocks 301-313 can be performed by (a) a pixel array, (b) a pixel of the pixel array, (c) a sample and hold circuitry array, (d) a sample and hold circuit of the sample and hold circuit array, (e) readout circuitry, (f) control circuitry, (g) one or more switch drivers, and/or (h) function logic. Furthermore, all or a subset of one or more of the blocks 301-313 can be executed in accordance with the discussion above.

Figure 4:
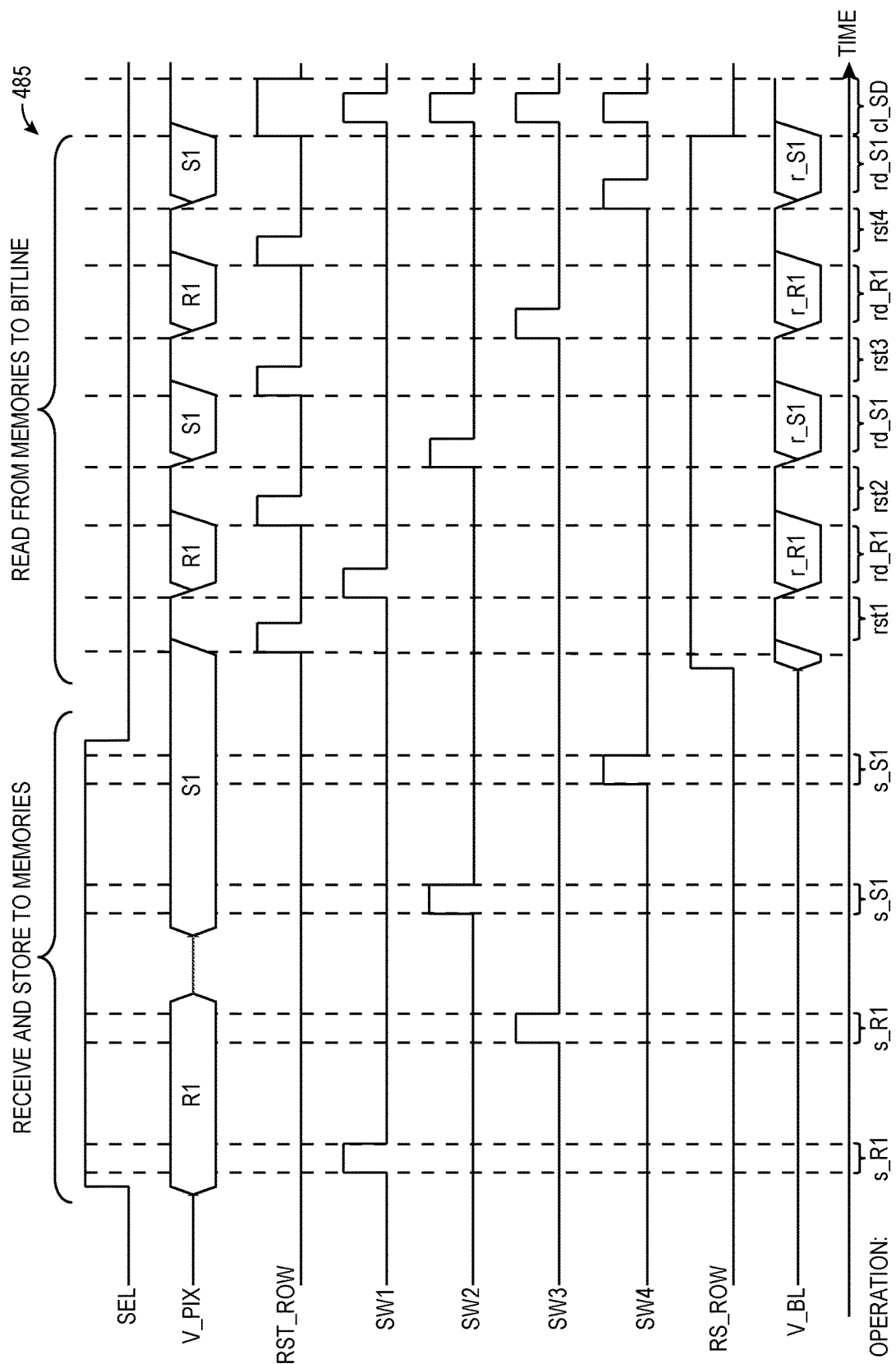
FIG. 4 is a timing diagram of signals used to operate an example pixel and corresponding sample and hold circuit, in accordance with various embodiments of the present technology.

For the sake of clarity and example, the method 300 of FIG. 3 is discussed in detail below with reference to FIGS. 4-5B. FIG. 4 is a timing diagram 485 of signals used to operate an example pixel and corresponding sample and hold circuit during image data storage and readout, in accordance with various embodiments of the present technology. FIGS. 5A and 5B each illustrate (i) a circuit diagram of a sample and hold circuit 569a corresponding to the timing diagram 485 of FIG. 4 and (ii) a partially schematic block diagram of a sample and hold circuit array 567 that includes individual sample and hold circuits 569a, 569b, and 569c. The sample and hold circuit 569a illustrated in FIGS. 5A and 5B includes four capacitors 534, 538, 542, and 546 that serve as storage devices of the sample and hold circuit 569a. For sake of clarity and example, in the discussion of the method 300 of FIG. 3 that follows, the capacitor 534 will be referred to as a "first storage device" of the sample and hold circuit 569a; the capacitor 542 will be referred to as a "second storage device"; the capacitor 538 will be referred to as a "third storage device"; and the capacitor 546 will be referred to as a "fourth storage device." Furthermore, and again for the sake of clarity and example, the capacitor 534 and the capacitor 538 will be referred to below as a first pair 591 of capacitors, and the capacitor 542 and the capacitor 546 will be referred to below as a second pair 592 of capacitors.

Referring to FIG. 3, the method 300 begins at block 301 by reading out a reset level signal R1 from a pixel into a sample and hold circuit. As discussed above with reference to FIG. 2, reading out the reset level signal R1 can include reading out the reset level signal R1 after resetting a voltage at a floating diffusion of the pixel. In these and other embodiments, reading out the reset level signal R1 can include asserting a row select signal SEL to (a) activate a row select transistor of the pixel and (b) read out the reset level signal R1 from the pixel into the sample and hold circuit along a corresponding pixel level connection. This process is partially shown in the timing diagram 485 of FIG. 4. More specifically, referring to FIGS. 4 and 5A together, a row select signal SEL (FIG. 4) is initially unasserted. The row select signal SEL is then asserted such that the reset level signal R1 (FIG. 4) is read out from the pixel to the sample and hold circuit 569a and appears as V_PIX at the pixel level connection 506.

In embodiments in which the pixel includes a DFD transistor, a second floating diffusion, and a LOFIC capacitor, the reset level signal R1 can correspond to (1) just the charge at the floating diffusion of the pixel (as opposed to the second floating diffusion and LOFIC capacitor) when the DFD transistor is deactivated while the reset level signal R1 is read out from the pixel, or (2) the charge at the floating diffusion, the second floating diffusion, and the LOFIC capacitor when the DFD transistor is activated while the reset level signal R1 is read out from the pixel. In some embodiments, the reset level signal R1 can correspond to only the charge at the floating diffusion of the pixel in a first frame, and can correspond to the charge at the floating diffusion, the second floating diffusion, and the LOFIC capacitor of the pixel in a second frame different from the first frame. Alternatively, the reset level signal R1 can consistently correspond to only the charge at the floating diffusion of the pixel across multiple frames, or can consistently correspond to the charge at the floating diffusion, the second floating diffusion and the LOFIC capacitor across multiple frames.

At block 302, the method 300 continues by storing the reset level signal R1 to a first storage device of the sample and hold circuit. In some embodiments, the first storage device includes a capacitor or another storage element. In these and other embodiments, storing the reset level signal R1 to the first storage device includes activating a switch to couple the first storage device to the pixel level connection. For example, the switch can be a transistor, and activating the transistor can include asserting a switch signal applied to a gate of the transistor.

Block 302 of the method 300 is illustrated as the first instance of operation s_R1 in the timing diagram 485 of FIG. 4. More specifically, referring to FIGS. 4 and 5A together, a switch signal SW1 is pulsed to activate transistor 532 (FIG. 5A) of the sample and hold circuit 569a to temporarily couple a first storage device (the capacitor 534 of FIG. 5A) of the sample and hold circuit 569a to the pixel level connection 506 (FIG. 5A). As a result, the reset level signal R1 at the pixel level connection 506 (and that appears as V_PIX in FIG. 4) is stored to the capacitor 534.

At block 303, the method 300 continues by storing the reset level signal R1 to a second storage device of the sample and hold circuit. In some embodiments, the second storage device includes a capacitor or another storage element. In these and other embodiments, storing the reset level signal R1 to the second storage device includes activating a switch to couple the second storage device to the pixel level connection. For example, the switch can be a transistor, and activating the transistor can include asserting a switch signal applied to a gate of the transistor.

Block 303 of the method 300 is illustrated as the second instance of operation s_R1 shown in the timing diagram 485 of FIG. 4. More specifically, referring to FIGS. 4 and 5A together, a switch signal SW3 is pulsed to activate transistor 540 (FIG. 5A) of the sample and hold circuit 569a to temporarily couple a second storage device (the capacitor 542 of FIG. 5A) of the sample and hold circuit 569a to the pixel level connection 506 (FIG. 5A). As a result, the reset level signal R1 at the pixel level connection 506 (appearing as V_PIX in FIG. 4) is stored to the capacitor 542. Note that the row select signal SEL (FIG. 4) can remain asserted for blocks 301-303 of the method 300.

At block 304, the method 300 continues by reading out a signal level signal S1 from the pixel into the sample and hold circuit. As discussed above with reference to FIG. 2, reading out the signal level signal S1 can include asserting a transfer signal TX to activate a transfer transistor of the pixel and couple a photosensor of the pixel to the floating diffusion. As the transfer transistor is activated, charge or photocurrent generated by the photosensor in response to incident light received from an external scene can be transferred to the floating diffusion, thereby changing a voltage applied to the gate of the source follower transistor. Reading out the signal level signal S1 can additionally include asserting the row select signal SEL (or leaving the row select signal SEL asserted) to activate the row select transistor of the pixel. When the row select transistor is activated, the signal level signal S1 (corresponding to the charge at the floating diffusion) can be read out of the pixel into the sample and hold circuit along the corresponding pixel level connection. This process is partially shown in the timing diagram 485 of FIG. 4. More specifically, referring to FIGS. 4 and 5A together, the row select signal SEL (FIG. 4) remains asserted in the illustrated embodiment after the reset level signal R1 is stored to the second storage device (the capacitor 542) of the sample and hold circuit 569a. A transfer signal TX (not shown) is then asserted to activate a transfer transistor of the pixel corresponding to the sample and hold circuit 569a, and the signal level signal S1 (FIG. 4) is read out from the pixel to the sample and hold circuit 569a and appears as V_PIX at the pixel level connection 506 (FIG. 5A).

In embodiments in which the pixel includes a DFD transistor, a second floating diffusion, and a LOFIC capacitor, the signal level signal S1 can correspond to (1) just the charge at the floating diffusion of the pixel (as opposed to the charge at the second floating diffusion and the LOFIC capacitor) when the DFD transistor is deactivated while the signal level signal S1 is read out from the pixel, or (2) the charge at the floating diffusion, the second floating diffusion, and the LOFIC capacitor when the DFD transistor is activated while the signal level signal S1 is read out from the pixel. In some embodiments, the signal level signal S1 can correspond to only the charge at the floating diffusion of the pixel in a first frame, and can correspond to the charge at the floating diffusion, the second floating diffusion, and the LOFIC capacitor of the pixel in a second frame different from the first frame. Alternatively, the signal level signal S1 can consistently correspond to only the charge at the floating diffusion of the pixel across multiple frames, or can consistently correspond to the charge at the floating diffusion, the second floating diffusion, and the LOFIC capacitor across multiple frames.

At block 305, the method 300 continues by storing the signal level signal S1 to a third storage device of the sample and hold circuit. In some embodiments, the third storage device includes a capacitor or another storage element. In these and other embodiments, storing the signal level signal S1 to the third storage device includes activating a switch to couple the third storage device to the pixel level connection. For example, the switch can be a transistor, and activating the transistor can include asserting a switch signal applied to a gate of the transistor.

Block 305 of the method 300 is illustrated as the first instance of operation s_S1 in the timing diagram 485 of FIG. 4. More specifically, referring to FIGS. 4 and 5A together, a switch signal SW2 is pulsed to activate transistor 536 (FIG. 5A) of the sample and hold circuit 569a to temporarily couple a third storage device (the capacitor 538 of FIG. 5A) of the sample and hold circuit 569a to the pixel level connection 506 (FIG. 5A). As a result, the signal level signal S1 at the pixel level connection 506 (appearing as V_PIX in FIG. 4) is stored to the capacitor 538. Note that the row select signal SEL (FIG. 4) can remain asserted for blocks 301-305 of the method 300. Alternatively, the row select signal SEL can be unasserted after storing the reset level signal R1 to the second storage device (the capacitor 542) of the sample and hold circuit 569a at block 303, and can then be reasserted at block 304 to read the signal level signal S1 from the pixel into the sample and hold circuit 569a.

At block 306, the method 300 continues by storing the signal level signal S1 to a fourth storage device of the sample and hold circuit. In some embodiments, the fourth storage device includes a capacitor or another storage element. In these and other embodiments, storing the signal level signal S1 to the fourth storage device includes activating a switch to couple the fourth storage device to the pixel level connection. For example, the switch can be a transistor, and activating the transistor can include asserting a switch signal applied to a gate of the transistor.

Block 306 of the method 300 is illustrated as the second instance of operation s_S1 in the timing diagram 485 of FIG. 4. More specifically, referring to FIGS. 4 and 5A together, a switch signal SW4 is pulsed to activate transistor 544 (FIG. 5A) of the sample and hold circuit 569a to temporarily couple a fourth storage device (the capacitor 546 of FIG. 5A) of the sample and hold circuit 569a to the pixel level connection 506 (FIG. 5A). As a result, the signal level signal S1 at the pixel level connection 506 (appearing as V_PIX in FIG. 4) is stored to the capacitor 546. Note that the row select signal SEL (FIG. 4) can remain asserted for blocks 304-306 of the method 300.

At block 307, the method 300 continues by determining whether the pixel (and/or the sample and hold circuit) corresponds to a first region of interest. In some embodiments, the first region of interest can correspond to every pixel of a corresponding pixel array and/or every sample and hold circuit of a corresponding sample and hold circuit array. In other embodiments, the first region of interest can correspond to a subset of the pixels of the corresponding pixel array and/or a subset of the sample and hold circuits of the corresponding sample and hold circuit array. The first region of interest can be preset and/or user-defined. Additionally, or alternatively, the first region of interest can be defined by a corresponding imaging system. For example, control circuitry of the corresponding imaging system can select the first region of interest (e.g., from a predetermined set of regions of interest) or can dynamically define (e.g., ahead of time or in real-time) the first region of interest (e.g., based on a particular application or desired result). When the method 300 (e.g., the control circuit or another component of a corresponding imaging system) determines that the pixel and/or the corresponding sample and hold circuit is included in the first region of interest (block 307: Yes), the method 300 proceeds to block 308. On the other hand, when the method 300 (e.g., the control circuit or another component of a corresponding imaging system) determines that the pixel and/or the corresponding sample and hold circuit is not included in the first region of interest (block 307: No), the method 300 proceeds to block 310.

Referring to FIG. 5A, an example first region of interest corresponding to a sample and hold circuit array 567 that includes the sample and hold circuit 569a is shown in solid black overlayed over the sample and hold circuit array 567. As shown, the first region of interest corresponds to every other row of sample and hold circuits 569 of the sample and hold circuit array 567. In other words, the first region of interest can correspond to a read out of every other row of pixels of a pixel array corresponding to the sample and hold circuit array 567 (at least in embodiments in which every pixel of the pixel array is connected to a corresponding and unique one of the sample and hold circuits 569 of the sample and hold circuit array 567). In the illustrated embodiment, the sample and hold circuit 569a and the sample and hold circuit 569b are shown as being included in the first region of interest. Thus, for the sample and hold circuits 569a and 569b, the method 300 of FIG. 3 would proceed from block 307 to block 308. On the other hand, the sample and hold circuit 569c is shown as being excluded from the first region of interest. Thus, for the sample and hold circuit 569c, the method 300 of FIG. 3 would proceed from block 307 to block 310.

At block 308, the method 300 continues by reading out the reset level signal R1 from the sample and hold circuit. Reading out the reset level signal R1 can include (i) asserting a row select row signal RS_ROW to activate a row select transistor of the sample and hold circuit and (ii) asserting a switch signal corresponding to one of the storage devices that is storing the reset level signal R1 in the sample and hold circuit (e.g., the first storage device or the second storage device in the example provided above for blocks 301-306).

Block 308 of the method 300 is illustrated as the first instance of operation rd_R1 in the timing diagram 485 of FIG. 4. More specifically, referring to FIGS. 4 and 5A together, a row select row signal RS_ROW is asserted to activate a row select transistor 572 (FIG. 5A) of the sample and hold circuit 569a. Then the switch signal SW1 is asserted to activate the transistor 532 (FIG. 5A) and couple the first storage device (the capacitor 534) of the sample and hold circuit 569a to the pixel level connection 506. In turn, the reset level signal R1 appears as V_PIX at the pixel level connection 506 and is applied to a gate of a source follower transistor 570 (FIG. 5A) of the sample and hold circuit 569a. An analog reset level signal r_R1 corresponding to the reset level signal R1 appears at the source of the source follower transistor 570, and is read out of the sample and hold circuit 569a as V_BL to readout circuitry (not shown) along a corresponding column bitline 580 (FIG. 5A). After reading the analog reset level signal r_R1 into the readout circuitry, an analog-to-digital converter of the readout circuitry can convert the analog reset level signal r_R1 into a corresponding digital value.

In some embodiments, the reset level signal R1 can be attenuated due to capacitive division when the transistor 532 is activated by asserting the switch signal SW1. In addition, an offset can be introduced to the voltage V_PIX that can depend on the value of the supply voltage SVD. Furthermore, noise can be introduced when the transistor 532 is deactivated by unasserting the switch signal SW1. Because (i) the attenuation that occurs due to capacitive division when the transistor 532 is activated is relatively small (e.g., less than 10%), (ii) the introduced offset is largely identical for the reset level signal R1 and a corresponding signal level signal S1 for first orders (with minor or negligible noise on the supply voltage SVD and minor or negligible mismatches between the different storage devices of the sample and hold circuit 569a), and (iii) the noise introduced when the transistor 532 is deactivated will be smaller than the original sample noise by a factor equivalent to the ratio of the parasitic capacitance at the pixel level connection 506 to the capacitance of the first storage device (the capacitor 534), each of these effects can be largely ignored. Therefore, although the attenuation, offset, and introduced noise effects can appear or occur for each of the other readouts at blocks 309, 311, and 312 below for similar reasons, the attenuation, offset, and introduced noise effects will not be discussed again at block 309, 311, and 312 below.

In some embodiments, as shown in FIG. 4, the voltage V_PIX at the pixel level connection 506 (FIG. 5A) in the sample and hold circuit 569a can be reset before reading out the reset level signal R1 by pulsing a reset row signal RST_ROW to activate a reset row transistor 554 (FIG. 5A) of the sample and hold circuit 569a and couple the pixel level connection 506 to the supply voltage SVD while the switch signals SW1, SW2, SW3, and SW4 are not asserted. This operation is shown as rst1 in FIG. 4.

Although the reset level signal R1 stored on the first storage device (the capacitor 534) of the sample and hold circuit 569a is read out for the first region of interest in the above example, the reset level signal R1 stored on the second storage device (the capacitor 542) of the sample and hold circuit 569a can be read out for the first region of interest in other embodiments by pulsing the switch signal SW3 at block 308 of the method 300 rather than the switch signal SW1. In some embodiments, which storage device of the sample and hold circuit 569a is used to read out the reset level signal R1 at block 308 of the method 300 can remain constant across multiple iterations of the method 300 (e.g., across multiple frames), or can alternate/change across the multiple iterations. For example, the first storage device can be used to read out the reset level signal R1 at block 308 of the method 300 for a first region of interest for a first frame, and the second storage device can be used to read out the reset level signal R1 at block 308 of the method 300 for a first region of interest for a second frame.

At block 309, the method 300 continues by reading out the signal level signal S1 from the sample and hold circuit. Reading out the signal level signal S1 can include (i) asserting the row select row signal RS_ROW (or leaving the row select row signal RS_ROW asserted) to activate the row select transistor of the sample and hold circuit and (ii) asserting a switch signal corresponding to one of the storage devices that is storing the signal level signal S1 in the sample and hold circuit (e.g., the third storage device or the fourth storage device in the example provided above for blocks 301-306).

Block 309 of the method 300 is illustrated as the first instance of operation rd_S1 in the timing diagram 485 of FIG. 4. More specifically, referring to FIGS. 4 and 5A together, the row select row signal RS_ROW is left asserted to keep the row select transistor 572 (FIG. 5A) of the sample and hold circuit 569a activated. The switch signal SW2 is then asserted to activate the transistor 536 (FIG. 5A) and couple the third storage device (the capacitor 538) of the sample and hold circuit 569a to the pixel level connection 506. In turn, the signal level signal S1 appears as V_PIX at the pixel level connection 506 and is applied to the gate of the source follower transistor 570 (FIG. 5A) of the sample and hold circuit 569a. An analog signal level signal r_S1 corresponding to the signal level signal S1 appears at the source of the source follower transistor 570, and is read out of the sample and hold circuit 569a as V_BL to the readout circuitry (not shown) along the corresponding column bitline 580 (FIG. 5A). After reading the analog signal level signal r_S1 into the readout circuitry, an analog-to-digital converter of the readout circuitry can convert the analog signal level signal r_S1 into a corresponding digital value. After receiving both the analog reset level signal r_R1 at block 308 of the method 300 and the analog signal level signal r_S1 at block 309 of the method 300, the digital values corresponding to these signals can be subtracted from each other in the digital domain (e.g., by function logic (not shown)) to recover a first image data signal corresponding to the pixel.

In some embodiments, as shown in FIG. 4, the voltage V_PIX at the pixel level connection 506 (FIG. 5A) in the sample and hold circuit 569a can be reset before reading out the signal level signal S1 from the sample and hold circuit 569a by pulsing the reset row signal RST_ROW to activate the reset row transistor 554 (FIG. 5A) of the sample and hold circuit 569a and couple the pixel level connection 506 to the supply voltage SVD while the switch signals SW1, SW2, SW3, and SW4 are not asserted. This operation is shown as rst2 in FIG. 4.

Although the signal level signal S1 stored on the third storage device (the capacitor 538) of the sample and hold circuit 569a is read out for the first region of interest in the above example, the signal level signal S1 stored on the fourth storage device (the capacitor 546) of the sample and hold circuit 569a can be read out for the first region of interest in other embodiments by pulsing the switch signal SW4 at block 309 of the method 300 rather than the switch signal SW2. In some embodiments, which storage device of the sample and hold circuit 569a is used to read out the signal level signal S1 at block 309 of the method 300 can remain constant across multiple iterations of the method 300 (e.g., across multiple frames), or can alternate/change across the multiple iterations. For example, the third storage device can be used to read out the signal level signal S1 at block 309 of the method 300 for a first region of interest for a first frame, and the fourth storage device can be used to read out the signal level signal S1 at block 309 of the method 300 for a first region of interest for a second frame.

Furthermore, although the first storage device (the capacitor 534) and the third storage device (the capacitor 538) of the sample and hold circuit 569a form a first pair 591 (FIG. 5A) of storage devices in the above example that is used to recover the first image data signal for the pixel, a different pairing of the storage devices of the sample and hold circuit 569a can be used to recover the first image data signal in other embodiments. For example, the first storage device (the capacitor 534) and the fourth storage device (the capacitor 546) of the sample and hold circuit 569a can be paired and used at blocks 308 and 309 of the method 300, respectively, to recover the first image data signal. As another example, the second storage device (the capacitor 542) and the third storage device (the capacitor 538) of the sample and hold circuit 569a can be paired and used at blocks 308 and 309 of the method 300, respectively, to recover the first image data signal. As still another example, the second storage device (the capacitor 542) and the fourth storage device (the capacitor 546) of the sample and hold circuit 569a can be paired and used at blocks 308 and 309 of the method 300, respectively, to recover the first image data signal.

At block 310, the method 300 continues by determining whether the pixel (and/or the sample and hold circuit) corresponds to a second region of interest. In some embodiments, the second region of interest can correspond to every pixel of a corresponding pixel array and/or every sample and hold circuit of a corresponding sample and hold circuit array. In other embodiments, the second region of interest can correspond to a subset of the pixels of the corresponding pixel array and/or a subset of the sample and hold circuits of the corresponding sample and hold circuit array. In some embodiments, the second region of interest can be the same as or different from the first region of interest discussed above with reference to blocks 307-309 of the method 300.

The second region of interest can be preset and/or user-defined. Additionally, or alternatively, the second region of interest can be defined by a corresponding imaging system. For example, control circuitry of the corresponding imaging system can select the second region of interest (e.g., from a predetermined set of regions of interest) or can dynamically define (e.g., ahead of time or in real-time) the second region of interest (e.g., based on a particular application or desired result). When the method 300 (e.g., the control circuit or another component of a corresponding imaging system) determines that the pixel and/or the corresponding sample and hold circuit is included in the second region of interest (block 310: Yes), the method 300 proceeds to block 311. On the other hand, when the method 300 (e.g., the control circuit or another component of a corresponding imaging system) determines that the pixel and/or the corresponding sample and hold circuit is not included in the second region of interest (block 310: No), the method 300 proceeds to block 313.

Referring to FIG. 5B, an example second region of interest corresponding to the sample and hold circuit array 567 is shown in solid black overlayed over the sample and hold circuit array 567. As shown, the second region of interest corresponds to a different subset of sample and hold circuits 569 of the sample and hold circuit array 567 than the first region of interest. In the illustrated embodiment, the sample and hold circuit 569a is shown as being included in the second region of interest. Thus, for the sample and hold circuit 569a, the method 300 of FIG. 3 would proceed from block 310 to block 311. On the other hand, the sample and hold circuits 569b and 569c are shown as being excluded from the second region of interest. Thus, for the sample and hold circuits 569b and 569c, the method 300 of FIG. 3 would proceed from block 310 to block 313.

At block 311, the method 300 continues by reading out the reset level signal R1 from the sample and hold circuit. Reading out the reset level signal R1 can include (i) asserting a row select row signal RS_ROW (or leaving the row select row signal RS_ROW asserted) to activate a row select transistor of the sample and hold circuit and (ii) asserting a switch signal corresponding to one of the storage devices that is storing the reset level signal R1 in the sample and hold circuit (e.g., the first storage device or the second storage device in the example provided above for blocks 301-306).

Block 311 of the method 300 is illustrated as the second instance of operation rd_R1 in the timing diagram 485 of FIG. 4. More specifically, referring to FIGS. 4 and 5B together, the row select row signal RS_ROW is left asserted to keep the row select transistor 572 (FIG. 5B) of the sample and hold circuit 569a activated. The switch signal SW3 is asserted to activate the transistor 540 (FIG. 5B) and couple the second storage device (the capacitor 542) of the sample and hold circuit 569a to the pixel level connection 506. In turn, the reset level signal R1 appears as V_PIX at the pixel level connection 506 and is applied to the gate of the source follower transistor 570 (FIG. 5B) of the sample and hold circuit 569a. An analog reset level signal r_R1 corresponding to the reset level signal R1 appears at the source of the source follower transistor 570, and is read out of the sample and hold circuit 569a as V_BL to the readout circuitry (not shown) along the corresponding column bitline 580 (FIG. 5B). After reading the analog reset level signal r_R1 into the readout circuitry, an analog-to-digital converter of the readout circuitry can convert the analog reset level signal r_R1 into a corresponding digital value.

In some embodiments, as shown in FIG. 4, the voltage V_PIX at the pixel level connection 506 (FIG. 5B) in the sample and hold circuit 569a can be reset before reading out the reset level signal R1 by pulsing the reset row signal RST_ROW to activate the reset row transistor 554 (FIG. 5B)

of the sample and hold circuit 569a and couple the pixel level connection 506 to the supply voltage SVD while the switch signals SW1, SW2, SW3, and SW4 are not asserted. This operation is shown as rst3 in FIG. 4.

Although the reset level signal R1 stored on the second storage device (the capacitor 542) of the sample and hold circuit 569a is read out for the second region of interest in the above example, the reset level signal R1 stored on the first storage device (the capacitor 534) of the sample and hold circuit 569a can be read out for the second region of interest in other embodiments by pulsing the switch signal SW1 at block 311 of the method 300 rather than the switch signal SW3. For example, in embodiments in which the pixel and/or the sample and hold circuit 569a is not included in the first region of interest (block 307: No), both the first storage device (the capacitor 534) and the second storage device (the capacitor 542) of the sample and hold circuit 569a may still store the reset level signal R1 when the method 300 reaches block 311. In these embodiments, the reset level signal R1 may be read out at block 311 using the first storage device (the capacitor 534) or the second storage device (the capacitor 542). On the other hand, if the pixel and/or the sample and hold circuit 569a is included in the first region of interest (block 307: Yes) and the reset level signal R1 is read using one of the first storage device (the capacitor 534) and the second storage device (the capacitor 542) at block 308, then the other of the first storage device (the capacitor 534) and the second storage device (the capacitor 542) can be used at block 311 to read out the reset level signal R1.

In some embodiments, which storage device of the sample and hold circuit 569a is used to read out the reset level signal R1 at block 311 of the method 300 can remain constant across multiple iterations of the method 300 (e.g., across multiple frames), or can alternate/change across the multiple iterations. For example, the second storage device can be used to read out the reset level signal R1 at block 311 of the method 300 for a second region of interest for a first frame, and the first storage device can be used to read out the reset level signal R1 at block 311 of the method 300 for a second region of interest for a second frame.

At block 312, the method 300 continues by reading out the signal level signal S1 from the sample and hold circuit. Reading out the signal level signal S1 can include (i) asserting the row select row signal RS_ROW (or leaving the row select row signal RS_ROW asserted) to activate the row select transistor of the sample and hold circuit and (ii) asserting a switch signal corresponding to one of the storage devices that is storing the signal level signal S1 in the sample and hold circuit (e.g., the third storage device or the fourth storage device in the example provided above for blocks 301-306).

Block 312 of the method 300 is illustrated as the second instance of operation rd_S1 in the timing diagram 485 of FIG. 4. More specifically, referring to FIGS. 4 and 5B together, the row select row signal RS_ROW is left asserted to keep the row select transistor 572 (FIG. 5B) of the sample and hold circuit 569a activated. The switch signal SW4 is then asserted to activate the transistor 544 (FIG. 5B) and couple the fourth storage device (the capacitor 546) of the sample and hold circuit 569a to the pixel level connection 506. In turn, the signal level signal S1 appears as V_PIX at the pixel level connection 506 and is applied to the gate of the source follower transistor 570 (FIG. 5B) of the sample and hold circuit 569a. An analog signal level signal r_S1 corresponding to the signal level signal S1 appears at the source of the source follower transistor 570, and is read out of the sample and hold circuit 569a as V_BL to the readout circuitry (not shown) along the corresponding column bitline 580 (FIG. 5B). After reading the analog signal level signal r_S1 into the readout circuitry, an analog-to-digital converter of the readout circuitry can convert the analog signal level signal r_S1 into a corresponding digital value.

After receiving both the analog reset level signal r_R1 at block 311 of the method 300 and the analog signal level signal r_S1 at block 312 of the method 300, the digital values corresponding to these signals can be subtracted from each other in the digital domain (e.g., by function logic (not shown)) to recover a second image data signal corresponding to the pixel. In some embodiments, the second image data signal recovered for the pixel can be generally the same as or equivalent to the first image data signal recovered for the pixel at block 309 of the method 300. In some embodiments, due to the larger amount of time that the reset level signal R1 and the signal level signal S1 corresponding to the second image data signal are stored in the sample and hold circuit 569a in comparison with the reset level signal R1 and the signal level signal S1 corresponding to the first image data signal, a larger amount of charge may leak from the storage devices storing the reset level signal R1 and the signal level signal S1 corresponding to the second image data signal than from the storage devices storing the reset level signal R1 and the signal level signal S1 corresponding to the first image data signal. The amount of charge loss from a given storage device can depend on a ratio of the capacitance of the given storage device to a parasitic capacitance at the gate of the source follower transistor 570 of the sample and hold circuit 569a, and can appear as gain error in the corresponding reset level signal R1 or signal level signal S1. In some embodiments, the imaging system (e.g., readout circuitry and/or function logic) can calibrate the reset level signal R1 corresponding to the second image data signal, the signal level signal S1 corresponding to the second image data signal, and/or the second image data signal to account for differences in the amounts of charge leakage between the second image data signal and the first image data signal.

In some embodiments, as shown in FIG. 4, the voltage V_PIX at the pixel level connection 506 (FIG. 5B) in the sample and hold circuit 569a can be reset before reading out the signal level signal S1 from the sample and hold circuit 569a by pulsing the reset row signal RST_ROW to activate the reset row transistor 554 (FIG. 5B) of the sample and hold circuit 569a and couple the pixel level connection 506 to the supply voltage SVD while the switch signals SW1, SW2, SW3, and SW4 are not asserted. This operation is shown as rst4 in FIG. 4.

Although the signal level signal S1 stored on the fourth storage device (the capacitor 546) of the sample and hold circuit 569a is read out for the second region of interest in the above example, the signal level signal S1 stored on the third storage device (the capacitor 538) of the sample and hold circuit 569a can be read out for the second region of interest in other embodiments by pulsing the switch signal SW2 at block 312 of the method 300 rather than the switch signal SW4. For example, in embodiments in which the pixel and/or the sample and hold circuit 569a is not included in the first region of interest (block 307: No), both the third storage device (the capacitor 538) and the fourth storage device (the capacitor 546) of the sample and hold circuit 569a may still store the signal level signal S1 when the method 300 reaches block 312. In these embodiments, the signal level signal S1 may be read out at block 312 using the third storage device (the capacitor 538) or the fourth storage device (the capacitor 546). On the other hand, if the pixel and/or the sample and hold circuit 569a is included in the first region of interest (block 307: Yes) and the signal level signal S1 is read using one of the third storage device (the capacitor 538) and the fourth storage device (the capacitor 546) at block 309, then the other of the third storage device (the capacitor 538) and the fourth storage device (the capacitor 546) can be used at block 312 to read out the signal level signal S1.

In some embodiments, which storage device of the sample and hold circuit 569a is used to read out the signal level signal S1 at block 312 of the method 300 can remain constant across multiple iterations of the method 300 (e.g., across multiple frames), or can alternate/change across the multiple iterations. For example, the fourth storage device can be used to read out the signal level signal S1 at block 312 of the method 300 for a second region of interest for a first frame, and the third storage device can be used to read out the signal level signal S1 at block 312 of the method 300 for a second region of interest for a second frame.

Furthermore, although the second storage device (the capacitor 542) and the fourth storage device (the capacitor 546) of the sample and hold circuit 569a form a second pair 592 (FIG. 5B) of storage devices in the above example that is used to recover the second image data signal for the pixel, a different pairing of the storage devices of the sample and hold circuit 569a can be used to recover the second image data signal in other embodiments. For example, the second storage device (the capacitor 542) and the third storage device (the capacitor 538) of the sample and hold circuit 569a can be paired and used at blocks 311 and 312 of the method 300, respectively, to recover the second image data signal. As another example, the first storage device (the capacitor 534) and the fourth storage device (the capacitor 546) of the sample and hold circuit 569a can be paired and used at blocks 311 and 312 of the method 300, respectively, to recover the second image data signal. As still another example, the first storage device (the capacitor 534) and the third storage device (the capacitor 538) of the sample and hold circuit 569a can be paired and used at blocks 311 and 312 of the method 300, respectively, to recover the second image data signal.

At block 313, the method 300 continues by resetting storages devices of the sample and hold circuit. In some embodiments, the storage devices (e.g., the capacitors) of the sample and hold circuit can exhibit memory. As a result, any storage devices storing signals that (i) are not read out of the sample and hold circuit for the first region of interest and (ii) are not read out of the sample and hold circuit for the second region of interest, can have a different response (and therefore cause image noise) in a next frame in comparison to those storage devices that stored signals that were read out of the sample and hold circuit for the first region of interest or the second region of interest. Thus, all or a subset of the storage devices of the sample and hold circuit can be reset at block 313 to prevent, reduce, or minimize memory effects.

In some embodiments, one or more of the storage devices can be reset at block 313 of the method 300 by coupling the one or more storage devices to the supply voltage SVD. For example, referring to FIG. 5A, the first storage device (the capacitor 534) of the sample and hold circuit 569a can be reset by asserting the reset row signal RST_ROW to activate the reset row transistor 554 while asserting the switch signal SW1 to activate the transistor 532. When the reset row signal RST_ROW and the switch signal SW1 are asserted together, the first storage device (the capacitor 534) is coupled to the supply voltage SVD to reset the voltage on the first storage device. This process is shown as part of a clear storage devices operation c1_SD in FIG. 4. A similar process can be simultaneously or sequentially performed for all or a subset of the other storage devices (e.g., all or a subset of the capacitors 538, 542, and/or 546).

In these and other embodiments, one or more of the storage devices can be reset at block 313 of the method 300 by grounding the one or more storage devices. For example, the first storage device (the capacitor 534) of the sample and hold circuit 569a of FIG. 5A can be grounded by shorting both plates or terminals of the first storage device together and/or to ground. Shorting both plates or terminals of the first storage device together and/or to ground can include selectively shorting both plates or terminals together and/or to ground by selectively activating a switch or transistor (not shown), such as a switch or transistor that selectively couples the plates or terminals together and/or to ground.

In some embodiments, resetting the storage devices at block 313 of the method 300 can include resetting all of the storage devices of the sampling and hold circuit, as is shown in the clear storage devices operation c1_SD in FIG. 4. More specifically, referring to FIGS. 4 and 5A together, after the signal level signal S1 (FIG. 4) is read out of the sample and hold circuit 569a (FIG. 5A) at block 312 of the method 300 using the fourth storage device (the capacitor 546) of the sample and hold circuit 569a (shown as the second instance of operation rd_S1 in FIG. 4), the reset row signal RST_ROW can be asserted to activate the reset row transistor 554 (FIG. 5A) and couple the pixel level connection 506 to the supply voltage SVD. In addition, all of the switch signals SW1-SW4 can be pulsed while the reset row signal RST_ROW is asserted to couple the top plates or terminals of the storage devices (the capacitor 534, the capacitor 538, the capacitor 542, and the capacitor 546) to the supply voltage SVD and thereby reset the voltages stored on the storage devices.

In other embodiments, resetting the storage devices at block 313 of the method 300 can include resetting only those storage devices that were not read at blocks 308, 309, 311, and/or 312 (or that were not read during read scanning). For example, referring to FIGS. 5A and 5B together, the sample and hold circuit 569b of the sample and hold circuit array 567 is included in the first region of interest shown in FIG. 5A but is not included in the second region of interest shown in FIG. 5B. Thus, assuming that the sample and hold circuit 569b (a) is structurally similar to the sample and hold circuit 569a and (b) is operated in a manner generally similar to the sample and hold circuit 569a, only two of the storage devices of the sample and hold circuit 569b are reset at block 313 because only those two storage devices will not have been read by the time that the imaging system finishes reading out pixels and/or sample and hold circuits corresponding to the first and second regions of interest. Continuing with this example, the sample and hold circuit 569c is not included in either of the first region of interest (FIG. 5A) or the second region of interest (FIG. 5B), and the sample and hold circuit 569a is included in both the first region of interest and the second region of interest. Therefore, all of the storage devices of the sample and hold circuit 569c and none of the storage devices of the sample and hold circuit 569a are reset at block 313. This is because none of the storage devices of the sample and hold circuit 569c and all of the storage devices of the sample and hold circuit 569a will have been read by the time that the imaging system finishes reading out pixels and/or sample and hold circuits corresponding to the first and second regions of interest.

Additionally, or alternatively, storage devices of a sample and hold circuit can be reset after they are used to read out a reset level signal R1 or a signal level signal S1 from the sample and hold circuit. For example, referring to FIGS. 4 and 5A together, after the first storage device (the capacitor 534) of the sample and hold circuit 569a is used to read out the reset level signal R1 from the sample and hold circuit, the first storage device can be reset. The reset of the first storage device (the capacitor 534) can occur before using the third storage device (the capacitor 538) of the sample and hold circuit to read out the signal level signal S1 from the sample and hold circuit. For example, the first storage device (the capacitor 534) can be reset during the reset operation rst2 shown in FIG. 4. Additionally, or alternatively, the reset of the first storage device (the capacitor 534) can occur after using the third storage device (the capacitor 538) of the sample and hold circuit to read out the signal level signal S1 from the sample and hold circuit. For example, the first storage device (the capacitor 534) can be reset during the reset operation rst3 shown in FIG. 4, and can be reset alone or in combination with the third storage device (the capacitor 538). In these and still other embodiments, the reset of the first storage device (the capacitor 534) can occur at another timing, such as during the reset operation rst4 or the clear storage devices operation c1_SD shown in FIG. 4.

Although the steps of the method 300 are discussed and illustrated in a particular order, the method 300 of FIG. 3 is not so limited. In other embodiments, the steps of the method 300 can be performed in a different order. For example, blocks 308 and 311 can swap positions in the method 300, and/or blocks 309 and 312 can swap positions in the method 300. In these and other embodiments, any of the steps of the method 300 can be performed before, during, and/or after any of the other steps of the method 300. For example, block 301 can be performed while executing blocks 302 and 303, and/or block 304 can be performed while executing blocks 305 and 306. As another example, block 303 can be performed before or while performing block 302, and/or block 306 can be performed before or while performing block 305. As still another example, blocks 304-306 can be performed before blocks 301-303, block 309 can be performed before block 308, and/or block 312 can be performed before block 311. As yet another example, blocks 310-312 of the method 300 corresponding to the second region of interest can be performed before blocks 307-309 of the method 300 corresponding to the first region of interest. As still other examples, block 303 can be performed before block 302, block 306 can be performed before block 305, block 309 can be performed before block 308, and/or block 312 can be performed before block 311.

Furthermore, a person skilled in the art will readily recognize that the method 300 can be altered and still remain within these and other embodiments of the present technology. For example, one or more steps of the method 300 can be omitted and/or repeated in some embodiments. As one specific example, block 313 can be omitted in some embodiments. For example, when a pixel and/or sample or hold circuit is not included in a region of interest, the imaging system (e.g., control circuitry, readout circuitry, a sample and hold circuit) can be configured to nevertheless read out a reset level signal R1 and a signal level signal S1 out of the sample and hold circuit for that region of interest (e.g., to maintain uniformity across the pixel array and/or the sample and hold circuitry array). The analog reset level signal r_R1 and the analog signal level signal r_S1 that are read out for that pixel and/or that sample and hold circuit can be ignored and/or discarded. For example, an ADC of readout circuitry that receives the analog reset level signal r_R1 and the analog signal level signal r_S1 for that pixel and/or that sample and hold circuit can be idled and/or disabled (thereby saving power) such that the ADC ignores the analog reset level signal r_R1 and the analog signal level signal r_S1. In these embodiments, block 313 can optionally be omitted as every storage device can be read out for every iteration of the method 300 and/or for every region of interest. Additionally, in some embodiments, the determinations made at blocks 307 and/or 310 can be used for determining whether to process or ignore specific analog reset level signals r_R1 and/or specific analog signal level signals r_S1 read out from a sample and hold circuit. Block 313 may also be optionally omitted in embodiments in which storage devices are reset following read out of those storage devices and before read out of other storage devices.

Additionally, or alternatively, (a) block 302 and block 305 and/or (b) block 303 and block 306 can be omitted from the method 300 in some embodiments. For example, block 307 and/or block 310 can be performed before or while performing block 301 and/or block 304. In these embodiments, the imaging system may know ahead of time whether the pixel and/or the sample and hold circuit corresponds to a particular region of interest, and therefore may disable the pixel and/or one or more storage devices of the sample and hold circuit from reading out or storing a reset level signal R1 or a signal level signal S1. For example, the imaging system may execute blocks 307 and/or 310 before or while executing block 301 to determine whether the pixel and/or the sample and hold circuit are included in the first region or interest and/or in the second region of interest. Continuing with this example, when the imaging system determines that the pixel or the sample and hold circuit is not included in the first region of interest (block 307: No) and/or that the pixel or the sample and hold circuit is included in the second region of interest (block 310: Yes), blocks 302 and/or 305 can be omitted from the method 300 (e.g., by not asserting the switch signal SW1 and/or the switch signal SW2) such that a reset level signal R1 and a signal level signal S1 read out from the corresponding pixel are not stored to the first storage device (the capacitor 534) or to the third storage device (the capacitor 538), respectively, of the sample and hold circuit. Blocks 308 and 309 can additionally be omitted from the method 300 in this example. As another example, (a) block 302 and block 305 or (b) block 303 and block 306 can be omitted from the method 300, such as when a user or the imaging system selectively disables the multiple read functionality of the imaging system (e.g., to perform HDR image capture, to store/read out only one copy of an image data signal from the sample and hold circuit, or to store/read a lesser number of copies of the image data signal than is possible to read out of the sample and hold circuit given the architecture of the sample and hold circuit).

As discussed above, the first through fourth storage device nomenclature given to the capacitors 534, 538, 542, and 546 of the sample and hold circuit 569a of FIGS. 5A and 5B; which of the capacitors 534, 538, 542, and 546 are used to store reset level signals R1 versus signal level signals S1; the pairings of the capacitors 534, 538, 542, and 546; and the order of the storing signals to and reading out signals from the capacitors 534, 538, 542, and 546 are provided above merely as an example and merely for the sake of clarity and understanding of the method 300 of FIG. 3. Any one of the capacitors 534, 538, 542, and 546 can serve as the first storage device, the second storage device, the third storage device, and/or the fourth storage device in other embodiments. Additionally, or alternatively, a capacitor that is designated as a particular storage device for the purposes of the method 300 can remain as that particular storage device for multiple iterations of the method 300 (e.g., across multiple frames), or the capacitor can be designated as a different storage device for the purposes of the method 300 in a different iteration of the method 300 (e.g., in a different frame). In these and other embodiments, which of the capacitors 534, 538, 542, and 546 of the sample and hold circuit 569a are used to store reset level signals versus signal level signals can be different in other embodiments and/or can change in different iterations of the method 300 (e.g., across different frames). In these and still other embodiments, the pairings of the capacitors 534, 538, 542, and 546 of the sample and hold circuit 569a can be different in other embodiments, and/or can change in different iterations of the method 300 (e.g., across different frames). Additionally, or alternatively, which of the capacitors 534, 538, 542, and 546 correspond to the first region of interest or the second region of interest can be different in other embodiments, and/or can change in different iterations of the method 300 (e.g., across different frames).

As a specific example, although the capacitor 534 of the sample and hold circuit 569a of FIGS. 5A and 5B are used to store the reset level signal R1 in the discussion above, the capacitor 534 can be used to store the signal level signal S1 in other embodiments or in a different (e.g., a next or subsequent) iteration of the method 300. Additionally, or alternatively, although the capacitor 534 of the sample and hold circuit 569a is the first storage device to which a signal is stored in the discussion above, the capacitor 534 can be the second, third, or last storage device to which a signal is stored in other embodiments or in a different (e.g., a next or subsequent) iteration of the method 300. As another example, although the capacitor 534 is paired with the capacitor 538 and corresponded to the first region of interest in the discussion above, the capacitor 534 can be paired with the capacitor 542 and/or the capacitor 546, and/or can correspond to the second region of interest, in other embodiments or in a different (e.g., next or subsequent) iteration of the method 300.

Although shown with four storage devices arranged in two pairs for reading out and recovering two copies of an image data signal corresponding to a pixel, the sample and hold circuit 569a of FIGS. 5A and 5B can include more than four or less than four storage devices arranged in more than two or less than two pairs for reading out and recovering more than two or less than two copies of an image data signal corresponding to a pixel. As a specific example, the sample and hold circuit 569a can include six storage devices arranged in three pairs for reading out and recovering three copies of an image data signal corresponding to a pixel. Continuing with this example, the method 300 of FIG. 3 can therefore include (i) an extra block similar to blocks 302 and/or 303 to load a third copy of the reset level signal R1 into a fifth storage device of the sample and hold circuit; (ii) an extra block similar to blocks 305 and/or 306 to load a third copy of the signal level signal S1 into a sixth storage device of the sample and hold circuit, and (iii) a third set of blocks similar to block 307-309 or blocks 310-312 that correspond to a third region of interest. As another example, the sample and hold circuit 569a can include two storage devices (e.g., only two storage devices), such as in embodiments in which image data signals are read out from a pixel without using CDS.

Figure 6:
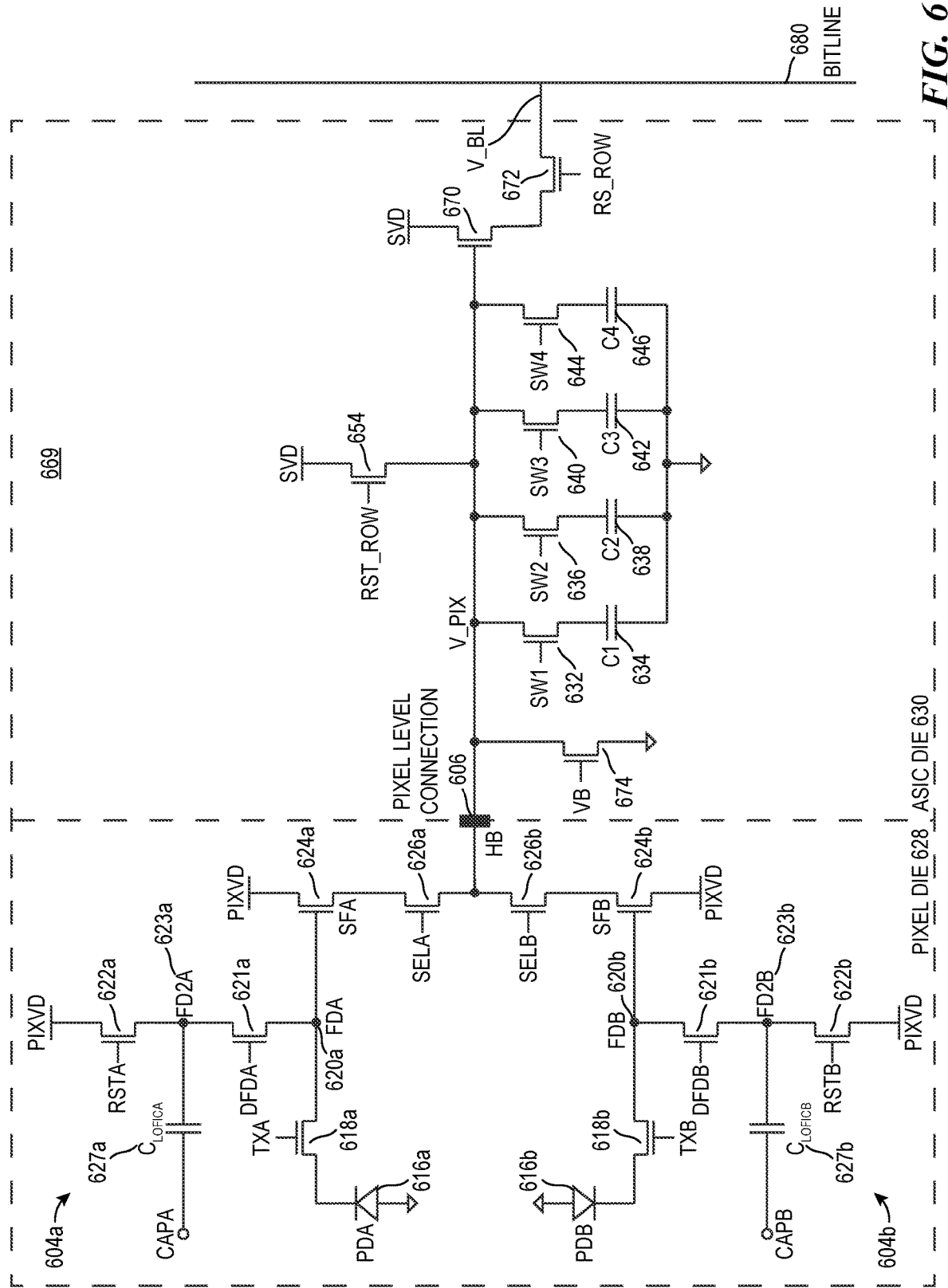
FIG. 6 is a partially schematic circuit diagram of two pixels and a corresponding sample and hold circuit, all configured in accordance with various embodiments of the present technology.

FIG. 6 is partially schematic circuit diagram of two pixels 604a and 604b and a corresponding sample and hold circuit 669, each configured in accordance with various embodiments of the present technology. The pixel 604a and/or the pixel 604b can be a pixel 104 of the pixel array 102 of FIG. 1, the pixel 204 of FIG. 2, or another pixel of the present technology. Additionally, or alternatively, the sample and hold circuit 669 can be one of the sample and hold circuits 169 of the sample and hold circuit array 167 of FIG. 1, the sample and hold circuit 269 of FIG. 2, the sample and hold circuit 569a of FIGS. 5A and 5B, or another sample and hold circuit of the present technology.

As shown, the pixels 604a and 604b share the sample and hold circuit 669. In some embodiments, the pixels 604a and 604b can alternate (e.g., per frame, per set of frames, per region of interest, per application, etc.) use of all or a subset of the storage devices 634, 638, 642, and/or 646 (and/or one or more other storage devices (not shown)) of the sample and hold circuit 669 to store and/or read out one or more copies of an image data signal corresponding to the pixel 604a and/or to the pixel 604b. Alternatively, a first subset of storage devices (e.g., the storage device 634, the storage device 638, and/or one or more other storage devices (not shown)) of the sample and hold circuit 669 can be dedicated to the pixel 604a; and a second subset of storage devices (e.g., the storage device 642, the storage device 646, and/or one or more other storage devices (not shown)) of the sample and hold circuit 669 can be dedicated to the pixel 604b.

C. CONCLUSION

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order above, alternative embodiments may perform steps in a different order. Furthermore, the various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any material incorporated herein by reference conflicts with the present disclosure, the present disclosure controls. Where context permits, singular or plural terms may also include the plural or singular term, respectively. In addition, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded. Moreover, as used herein, the phrases "based on," "depends on," "as a result of," and "in response to" shall not be construed as a reference to a closed set of conditions. For example, an exemplary step that is described as "based on condition A" may be based on both condition A and condition B without departing from the scope of the present disclosure. In other words, as used herein, the phrase "based on" shall be construed in the same manner as the phrase "based at least in part on" or the phrase "based at least partially on." Also, the terms "connect" and "couple" are used interchangeably herein and refer to both direct and indirect connections or couplings. For example, where the context permits, element A "connected" or "coupled" to element B can refer (i) to A directly "connected" or directly "coupled" to B and/or (ii) to A indirectly "connected" or indirectly "coupled" to B.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments. Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

What is claimed is:

1. A method comprising:
   reading out a reset level signal from a pixel to a sample and hold circuit;
   storing the reset level signal to a first storage device of the sample and hold circuit;
   storing the reset level signal to a second storage device of the sample and hold circuit;
   reading out a signal level signal from the pixel to the sample and hold circuit;
   storing the signal level signal to a third storage device of the sample and hold circuit; and
   storing the signal level signal to a fourth storage device of the sample and hold circuit,
   wherein the first storage device, the second storage device, the third storage device, and the fourth storage device are different from one another, and
   wherein the reset level signal and the signal level signal correspond to a same correlated double sampling of an image data signal captured by the pixel.

2. The method of claim 1, further comprising:
   reading out the reset level signal from the first storage device to readout circuitry coupled to the sample and hold circuit;
   reading out the signal level signal from the third storage device to the readout circuitry; and
   recovering a first copy of the image data signal based at least in part on the reset level signal and the signal level signal readout from the first storage device and the third storage device, respectively.

3. The method of claim 2, further comprising:
   reading out the reset level signal from the second storage device to readout circuitry coupled to the sample and hold circuit;
   reading out the signal level signal from the fourth storage device to the readout circuitry; and
   recovering a second copy of the image data signal based at least in part on the reset level signal and the signal level signal readout from the second storage device and the fourth storage device, respectively.

4. The method of claim 2, wherein:
   the method further comprises determining that the pixel or the sample and hold circuit correspond to a first region of interest of a pixel array including the pixel or of a sample and hold circuit array including the sample and hold circuit, respectively; and
   reading out the reset level signal and reading out the signal level signal are performed based at least in part on determination.

5. The method of claim 4, wherein reading out the reset level signal and reading out the signal level signal include reading out the reset level signal and reading out the signal level signal only when the pixel or the sample and hold circuit correspond to the first region of interest.

6. The method of claim 4, further comprising:
   determining that the pixel or the sample and hold circuit correspond to a second region of interest of the pixel array or of the sample and hold circuit array; and
   in response to determining that the pixel or the sample and hold circuit correspond to the second region of interest—
   reading out the reset level signal from the second storage device to readout circuitry coupled to the sample and hold circuit;
   reading out the signal level signal from the fourth storage device to the readout circuitry.

7. The method of claim 6, wherein the second region of interest is different from the first region of interest.

8. The method of claim 1, further comprising:
   determining that the pixel or the sample and hold circuit does not correspond to a first region of interest of (i) a pixel array including the pixel or (ii) a sample and hold circuit array including the sample and hold circuit, respectively; and
   in response to determining that the pixel or the sample and hold circuit does not correspond to the first region of interest—
   resetting the first storage device to clear the reset signal-level signal from the first storage device; and
   resetting the third storage device to clear the signal level signal from the third storage device.

9. The method of claim 1, wherein:
   the reading of the reset level signal from the pixel, the storing of the reset level signal to the first and second storage devices, the reading of the signal level signal from the pixel, and the storing of the signal level signal to the third and fourth storage devices, each correspond to a first frame; and
   the method further comprises resetting only those of the first storage device, the second storage device, the third storage device, and the fourth storage device that are not used to read out the reset level signal or the signal level signal from the sample and hold circuit by an end of the first frame.

10. The method of claim 1, wherein:
    the reset level signal is a first reset level signal, the signal level signal is a first signal level signal, and the image data signal is a first image data signal;
    the reading of the first reset level signal from the pixel, the storing of the first reset level signal to the first and second storage devices, the reading of the first signal level signal from the pixel, and the storing of the first signal level signal to the third and fourth storage devices, each correspond to a first frame;
    the method further comprises— reading out a second reset level signal from the pixel to the sample and hold circuit, storing the second reset level signal to the third storage device, reading out a second signal level signal from the pixel to the sample and hold circuit, the second reset level signal and the second signal level signal corresponding to a same correlated double sampling of a second image data signal captured by the pixel, and storing the second signal level signal to the first storage device; and the reading of the second reset level signal from the pixel, the storing of the second reset level signal to the third storage device, the reading of the second signal level signal from the pixel, and the storing of the second signal level signal to the first storage device, each correspond to a second frame different from the first frame.

11. The method of claim 2 wherein:

the reset level signal is a first reset level signal, the signal level signal is a first signal level signal, and the image data signal is a first image data signal;

the reading of the first reset level signal from the pixel, the storing of the first reset level signal to the first and second storage devices, the reading of the first signal level signal from the pixel, the storing of the first signal level signal to the third and fourth storage devices, the reading of the first reset level signal to the readout circuitry, the reading of the first signal level signal to the readout circuitry, and the recovering of the first copy of the first image data signal, each correspond to a first frame;

the method further comprises— reading out a second reset level signal from the pixel to the sample and hold circuit;

storing the second reset level signal to the first storage device and the second storage device of the sample and hold circuit;

reading out a second signal level signal from the pixel to the sample and hold circuit, the second reset level signal and the second signal level signal corresponding to a same correlated double sampling of a second image data signal captured by the pixel, storing the second signal level signal to the third storage device and the fourth storage device of the sample and hold circuit, reading out the second reset level signal from the first storage device to the readout circuitry, reading out the second signal level signal from the fourth storage device to the readout circuitry, and recovering a first copy of the second image data signal based at least in part on the second reset level signal and the second signal level signal readout from the first storage device and the fourth storage device, respectively; and the reading of the second reset level signal from the pixel, the storing of the second reset level signal to the first and second storage devices, the reading of the second signal level signal from the pixel, the storing of the second signal level signal to the third and fourth storage devices, the reading of the second reset level to the readout circuit, and the reading of the second signal level to the readout circuit, each correspond to a second frame different from the first frame.

12. The method of claim 3, wherein:

the reset level signal is a first reset level signal, the signal level signal is a first signal level signal, and the image data signal is a first image data signal;

the reading of the first reset level signal and the first signal level signal from the first storage device and the third storage device, respectively, to the readout circuitry and the reading of the first reset level signal and the first signal level signal from the second storage device and the fourth storage device, respectively, to the readout circuitry, each correspond to a first frame;

the reading of the first reset level signal and the first signal level signal from the first storage device and the third storage device, respectively, to the readout circuitry occurs prior to the reading of the first reset level signal and the first signal level signal from the second storage device and the fourth storage device, respectively, to the readout circuitry;

the method further comprises— reading out a second reset level signal from the pixel to the sample and hold circuit;

storing the second reset level signal to the first storage device and the second storage device of the sample and hold circuit;

reading out a second signal level signal from the pixel to the sample and hold circuit, the second reset level signal and the second signal level signal corresponding to a same correlated double sampling of a second image data signal captured by the pixel, storing the second signal level signal to the third storage device and the fourth storage device of the sample and hold circuit, and reading out the second reset level signal and the second signal level signal from the second storage device and the fourth storage device, respectively, to the readout circuitry prior to reading out the second reset level signal and the second signal level signal from the first storage device and the third storage device; and the reading of the second reset level signal from the pixel, the storing of the second reset level signal to the first and second storage devices, the reading of the second signal level signal from the pixel, the storing of the second signal level signal to the third and fourth storage devices, the reading of the second reset level to the readout circuit, and the reading of the second signal level to the readout circuit, each correspond to a second frame different from the first frame.

13. The method of claim 1, further comprising selectively disabling storing copies of signal level signals corresponding to a same image data signal to multiple storage devices of the sample and hold circuit.

* * * * *